US00RE42788E

(19) United States
(12) Reissued Patent
Bourlas et al.

(10) Patent Number: US RE42,788 E
(45) Date of Reissued Patent: Oct. 4, 2011

(54) METHOD AND APPARATUS FOR SYNCHRONIZATION BETWEEN MAC AND PHYSICAL LAYERS IN A WIRELESS COMMUNICATION SYSTEM

(75) Inventors: Yair Bourlas, San Diego, CA (US); Jacques Behar, San Diego, CA (US); Kenneth L. Stanwood, Vista, CA (US); Gary Lee Samad, Jr., Poway, CA (US)

(73) Assignee: Harington Valve, LLC, Las Vegas, NV (US)

(21) Appl. No.: 11/499,822

(22) Filed: Aug. 3, 2006
(Under 37 CFR 1.47)

Related U.S. Patent Documents

Reissue of:
(64) Patent No.: 6,771,660
Issued: Aug. 3, 2004
Appl. No.: 09/696,934
PCT Filed: Oct. 25, 2000

U.S. Applications:
(63) Continuation-in-part of application No. 09/430,379, filed on Oct. 29, 1999, now Pat. No. 6,683,866.

(51) Int. Cl.
*H04B 7/00* (2006.01)

(52) U.S. Cl. ..... 370/466; 370/338; 370/329; 370/474; 370/395.1; 370/226; 370/310.1; 370/350; 370/465; 370/310.2; 370/347

(58) Field of Classification Search ..... 370/310.1, 370/466, 216, 225, 241.1, 242, 389, 395.53, 370/395.64, 395.65, 474, 469; 455/3.01
See application file for complete search history.

(56) References Cited

U.S. PATENT DOCUMENTS
4,975,906 A * 12/1990 Takiyasu et al. ..... 370/401
(Continued)

FOREIGN PATENT DOCUMENTS
EP 0622924 A 11/1994
(Continued)

OTHER PUBLICATIONS
"Asynchronous Transfer Mode (ATM) Technical Overview", 2nd Edition, Prentic Hall, Oct. 1995, Chapter 3, pp. 21-25.
(Continued)

*Primary Examiner* — Sharad Rampuria
(74) *Attorney, Agent, or Firm* — Schwabe, Williamson & Wyatt, P.C.

(57) ABSTRACT

The present invention is a novel method and apparatus for efficiently transporting and synchronizing data between the Media Access Control (MAC) and physical communication protocol layers in a wireless communication system. An inventive method and apparatus for transporting and synchronizing to fixed-length ATM cell boundaries and for protecting against the potential misinsertion of ATM cells has been described. An inventive ATM packet format is described. The ATM packet format is used by the present invention for the transportation and synchronization of ATM cells. The ATM packets include fields that are used to detect errors occurring within each ATM cell. ATM cells are transported in exactly two TC/PHY packets, or TDUs. ATM header information is contained in the first TDU only. No ATM header information is carried by the second TDU. An entire ATM cell is discarded if an uncorrectable error is detected in the first TDU. If no uncorrectable error occurs in the first TDU, the second TDU is checked for errors. If an undetectable error exists in the second TDU, no discard action is taken. The error is noted, and both TDUs are passed through to the higher MAC communication layers. The inventive method protects against errors occurring in the ATM header because the ATM header is always carried in the first TDU. Consequently, misinsertion of ATM cells is also prevented.

65 Claims, 17 Drawing Sheets

U.S. PATENT DOCUMENTS

| | | | | |
|---|---|---|---|---|
| 5,130,893 | A | 7/1992 | Heffner, III | |
| 5,130,983 | A | 7/1992 | Heffner, III | 370/85.8 |
| 5,402,422 | A * | 3/1995 | Liu et al. | 370/443 |
| 5,404,374 | A | 4/1995 | Mullins et al. | |
| 5,444,702 | A * | 8/1995 | Burnett et al. | 370/254 |
| 5,457,687 | A * | 10/1995 | Newman | 370/232 |
| 5,638,371 | A * | 6/1997 | Raychaudhuri et al. | 370/310.2 |
| 5,666,358 | A * | 9/1997 | Paratore et al. | 370/347 |
| 5,684,791 | A * | 11/1997 | Raychaudhuri et al. | 370/310.2 |
| 5,745,837 | A * | 4/1998 | Fuhrmann | 725/114 |
| 5,751,708 | A * | 5/1998 | Eng et al. | 370/395.42 |
| 5,774,461 | A * | 6/1998 | Hyden et al. | 370/310.2 |
| 5,844,906 | A * | 12/1998 | Khelghatti et al. | 370/474 |
| 5,859,848 | A * | 1/1999 | Miura et al. | 370/395.31 |
| 5,892,763 | A * | 4/1999 | Laraqui et al. | 370/395.53 |
| 5,926,478 | A * | 7/1999 | Ghaibeh et al. | 370/395.51 |
| 5,946,313 | A * | 8/1999 | Allan et al. | 370/397 |
| 5,970,062 | A * | 10/1999 | Bauchot | 370/310.2 |
| 6,016,311 | A * | 1/2000 | Gilbert et al. | 370/280 |
| 6,064,649 | A * | 5/2000 | Johnston | 370/310.2 |
| 6,147,989 | A * | 11/2000 | Esaki et al. | 370/355 |
| 6,188,680 | B1 * | 2/2001 | Ohki | 370/338 |
| 6,189,041 | B1 * | 2/2001 | Cox et al. | 709/238 |
| 6,201,811 | B1 * | 3/2001 | Larsson et al. | 370/310.1 |
| 6,339,585 | B1 * | 1/2002 | Hulyalkar et al. | 370/226 |
| 6,370,112 | B1 | 4/2002 | Voelker | |
| 6,452,927 | B1 * | 9/2002 | Rich | 370/395.1 |
| 6,469,991 | B1 * | 10/2002 | Chuah | 370/329 |
| 6,683,866 | B1 * | 1/2004 | Stanwood et al. | 370/350 |
| 6,925,068 | B1 | 8/2005 | Stanwood et al. | |
| 6,940,823 | B1 * | 9/2005 | Park et al. | 370/252 |
| 7,583,623 | B2 * | 9/2009 | Zimmerman et al. | 370/310.1 |

FOREIGN PATENT DOCUMENTS

| | | | |
|---|---|---|---|
| WO | 9810568 | A | 3/1998 |

OTHER PUBLICATIONS

International Search Report for PCT Application PCT/US00/29687 dated Mar. 28, 2001.

International Preliminary Examination Report for PCT Application PCT/US00/29687 dated Dec. 18, 2001.

Office Action for U.S. Appl. No. 09/430,379 mailed Jan. 15, 2003.

Notice of Allowance for U.S. Appl. No. 09/430,379 mailed Jul. 28, 2003.

Notice of Allowability for U.S. Appl. No. 09/696,934 mailed Feb. 6, 2004.

U.S. Appl. No. 09/316,518, Stanwood et al., filed May 21, 1999.

* cited by examiner

Layered Data Transport Architecture

TC/PHY Packet Format

Mapping of Variable Length Packets to PHY

Downlink Mapping of MAC Messages to PHY Elements

Uplink Mapping of MAC Messages to PHY Elements

METHOD AND APPARATUS FOR SYNCHRONIZATION BETWEEN MAC AND PHYSICAL LAYERS IN A WIRELESS COMMUNICATION SYSTEM

Matter enclosed in heavy brackets [ ] appears in the original patent but forms no part of this reissue specification; matter printed in italics indicates the additions made by reissue.

CROSS-REFERENCE TO RELATED APPLICATIONS

This is a Continuation-In-Part (CIP, application of commonly assigned application Ser. No.: 09/430,379, filed Oct. 29, 1999, now U.S. Pat. No. 6,683,866, entitled "Method and Apparatus for Data Transportation and Synchronization between MAC and Physical Layers in a Wireless Communication System", incorporated by reference herein in its entirety. This invention is also related to commonly assigned U.S. Pat. No. : 6,016,311, issued Jan. 18, 2000, entitled "An Adaptive Time Division Duplexing Method and Apparatus for Dynamic Bandwidth Allocation within a Wireless Communication System", and commonly assigned co-pending; application Ser. No. 09/316,518, filed May 21, 1999 entitled "Method and Apparatus for Allocating Bandwidth in a Wireless Communication System", both the patent and application hereby incorporated by reference herein for their teachings on wireless communication systems.

BACKGROUND OF THE INVENTION

1. Field of the Invention

This invention relates to wireless communication systems, and more particularly to a method and apparatus for efficiently synchronizing MAC and physical communication protocol layers of a wireless communication system.

2. Description of Related Art

As described in the commonly assigned related U.S. Pat. No. : 6,016,311, a wireless communication system facilitates two-way communication between a plurality of subscriber radio stations or subscriber units (fixed and portable) and a fixed network infrastructure. Exemplary communication systems include mobile cellular telephone systems, personal communication systems (PCS), and cordless telephones. The key objective of these wireless communication systems is to provide communication channels on demand between the plurality of subscriber units and their respective base stations in order to connect a subscriber unit user with the fixed network infrastructure (usually a wire-line system). In the wireless systems having multiple access schemes a time "frame" is used as the basic information transmission unit. Each frame is sub-divided into a plurality of time slots. Some time slots are used for control purposes and some for information transfer. Subscriber units typically communicate with a selected base station using a "duplexing" scheme thus allowing for the exchange of information in both directions of connection.

Transmissions from the base station to the subscriber unit are commonly referred to as "downlink" transmissions. Transmissions from the subscriber unit to the base station are commonly referred to as "uplink" transmissions. Depending upon the design criteria of a given system, the prior art wireless communication systems have typically used either time division duplexing (TDD) or frequency division duplexing (FDD) methods to facilitate the exchange of information between the base station and the subscriber units. Both the TDD and FDD duplexing schemes are well known in the art.

Recently, wideband or "broadband" wireless communications networks have been proposed for delivery of enhanced broadband services such as voice, data and video. The broadband wireless communication system facilitates two-way communication between a plurality of base stations and a plurality of fixed subscriber stations or Customer Premises Equipment (CPE). One exemplary broadband wireless communication system is described in the incorporated U.S. Pat. No. : 6,016,311, and is shown in the block diagram of FIG. 1. As shown in FIG. 1, the exemplary broadband wireless communication system 100 includes a plurality of cells 102. Each cell 102 contains an associated cell site 104 that primarily includes a base station 106 and an active antenna array 108. Each cell 102 provides wireless connectivity between the cell's base station 106 and a plurality of customer premises equipment (CPE) 110 positioned at fixed customer sites 112 throughout the coverage area of the cell 102. The users of the system 100 may include both residential and business customers. Consequently, the users of the system have different and varying usage and bandwidth requirement needs. Each cell may service several hundred or more residential and business CPEs.

The broadband wireless communication system 100 of FIG. 1 provides true "bandwidth-on-demand" to the plurality of CPEs 110. CPEs 110 request bandwidth allocations from their respective base stations 106 based upon the type and quality of services requested by the customers served by the CPEs. Different broadband services have different bandwidth and latency requirements. The type and quality of services available to the customers are variable and selectable. The amount of bandwidth dedicated to a given service is determined by the information rate and the quality of service required by that service (and also taking into account bandwidth availability and other system parameters). For example, T1-type continuous data services typically require a great deal of bandwidth having well controlled delivery latency. Until terminated, these services require constant bandwidth allocation for each frame. In contrast, certain types of data services such as Internet protocol data services (TCP/IP) are bursty, often idle (which at any one instant may require zero bandwidth), and are relatively insensitive to delay variations when active. The base station media access control ("MAC") allocates available bandwidth on a physical channel on the uplink and the downlink. Within the uplink and downlink sub-frames, the base station MAC allocates the available bandwidth between the various services depending upon the priorities and rules imposed by their quality of service ("QoS"). The MAC transports data between a MAC "layer" (information higher layers such as TCP/IP) and a "physical layer" (information on the physical channel).

Due to the wide variety of CPE service requirements, and due to the large number of CPEs serviced by any one base station, the bandwidth allocation process in a broadband wireless communication system such as that shown in FIG. 1 can become burdensome and complex. This is especially true with regard to rapidly transporting data while maintaining synchronization between the MAC and physical communication protocol layers. Base stations transport many different data types (e.g., T1 and TCP/IP) between the MAC and physical layers through the use of data protocols. One objective of a communication protocol is to efficiently transport data between the MAC and physical layers. A communication protocol must balance the need for transmitting data at maximum bandwidth at any given time against the need for maintaining synchronization between the MAC and physical layers when the data is lost during transportation.

Prior art communication protocols have been proposed for transporting data in a wireless communication system. One prior art communication protocol teaches a system for transporting MAC messages to the physical layer using variable length data packets comprising headers and payloads. A payload contains data for a MAC message data type (e.g., T1 and TCP/IP). In the prior art, a header starts at a physical layer boundary and provides the wireless communication system with information such as the length of the payload and the location of the next data packet. Typically, the communication protocol provides adequate bandwidth usage via the variable length data packets. However, this type of protocol provides poor synchronization between the MAC and physical layers because when the system loses a header the protocol overlooks all of the subsequent data until it finds the next header at the beginning of the physical layer boundary. The system then begins using data from that physical layer boundary. Thus, the variable length data packet protocol loses a relatively large amount of received data (i.e., the data received between the lost header and the next physical boundary). It is therefore an inefficient communication protocol for use in a wireless communication system.

Another prior art protocol teaches a system for transporting MAC messages using fixed length data packets. In accordance with these systems, a message always begins at a fixed position relative to the other messages. When the system loses a part of a message, the protocol only loses that one message because it can find the next message at the next fixed position. Thus, the fixed length data packet protocol provides adequate MAC to physical layer synchronization. However, the fixed length data packet protocol provides poor bandwidth usage because a fixed length data packet must be sufficiently large to accommodate the largest message from any given data type. As most messages are much smaller than the largest message, the fixed length packet protocol typically wastes a large amount of bandwidth on a regular basis.

Prior art protocols also inefficiently handle the transportation and synchronization of ATM cell data. In typical wireless communication systems, ATM header information is protected from errors using a Header Error Check (HEC) byte. Alternatively, entire ATM cells are protected against errors using either a Forward Error Correction (FEC) or CRC byte. The FEC makes the HEC redundant and thus the HEC is often removed prior to transmission. Disadvantageously, when an error is detected in these systems the entire ATM cell is discarded. This is necessary to prevent the possible misinsertion of the corrupted ATM cell into higher layers of the MAC protocol. However, the discard of entire ATM cells wastes valuable bandwidth and requires the re-transmission of ATM cell data.

Therefore, a need exists for a data transportation and synchronization method and apparatus for efficiently transporting data between the MAC and physical layers in a wireless communication system. The data transportation and synchronization method and apparatus should accommodate an arbitrarily large number of CPEs generating frequent and varying bandwidth allocation requests on the uplink of a wireless communication system. Such a data transportation and synchronization method and apparatus should be efficient in terms of the amount of bandwidth consumed by the messages exchanged between the plurality of base stations and the plurality of CPEs in both the uplink and downlink. In addition, the data transportation and synchronization method and apparatus should rapidly synchronize to the next data message when a part of a message is lost as to prevent a large loss in data. Finally, the data transportation and synchronization method should provide a mechanism for synchronization to ATM cell boundaries. The data transportation and synchronization method should also prevent the misinsertion of ATM cells into the higher MAC communication layers. The present invention provides such a data transportation and synchronization method and apparatus.

SUMMARY OF THE INVENTION

The present invention is a novel method and apparatus for efficiently transporting and synchronizing data between the and physical layers in a wireless communication system. The method and apparatus reduces the amount of unused bandwidth in a wireless communication system. The present invention advantageously synchronizes rapidly to the next data message when a data message header is lost across the data or the air link. The present invention utilizes a combination of data formats and a data transportation technique to efficiently transport data in a communication system.

In the preferred embodiment of the present invention, the data format for a MAC packet is preferably variable in length. Depending on the length of the MAC packet to be transported, the present invention either fragments or concatenates the MAC packet during mapping to the physical layer. The physical layer contains Transmission Convergence/Physical ("TC/PHY") packets having fixed length payloads. The present invention includes a novel technique for transporting and mapping variable length MAC packets into TC/PHY packets.

In accordance with the present invention, the present inventive method initiates the data transportation and synchronization technique by obtaining a MAC packet. The method determines whether the MAC packet is longer than the available bits in the payload of the present TC/PHY packet. If so, the method proceeds to fragment the MAC packet and map the fragments into successive TC/PHY packets. The present inventive method and apparatus may be adapted for use in either an FDD or TDD communication system. When used in a TDD system, the successive TC/PHY packets are preferably transmitted back-to-back within the same TDD frame.

If the method determines that the MAC packet is shorter than the available bits in the payload of the present TC/PHY packet, the method proceeds to map the MAC packet. After mapping the MAC packet to the TC/PHY packet the method determines whether the next MAC packet should be mapped with the previous MAC packet in the TC/PHY packet. The method will concatenate the next and previous MAC packets unless either of the following two conditions applies. The first condition is a change in modulation on the downlink. Upon such a change, the first packet at the new modulation starts in a new TC/PHY packet following a modulation transition gap (MTG). The second condition is a change in CPE on the uplink. Upon such a change, the first packet from the next CPE starts in a new TC/PHY packet following a CPE transition gap (CTG). If neither condition applies, the method maps the next and previous MAC packet in the same TC/PHY packet in the manner described above.

An inventive method and apparatus for transporting and synchronizing to fixed-length ATM cell boundaries and for protecting against the potential misinsertion of ATM cells is described. An inventive ATM packet format is also described. The ATM packet format is used by the present invention for the transportation and synchronization of ATM cells. The ATM packets include TC CRC and FEC fields that are used to detect errors occurring within each ATM cell. In accordance with the present invention, ATM cells are transported in exactly two TC/PHY packets, or TDUs. The first TDU includes an ATM-MAC header. Significantly, the ATM header information is contained in the first TDU only. No ATM header information is carried by the second TDU. In accordance with the present invention, an entire ATM cell is discarded if an uncorrectable error is detected in the first TDU. If no uncorrectable error occurs in the first TDU, the second TDU is checked for errors. If an undetectable error exists in the second TDU, no discard action is taken. The error is noted, and both TDUs are passed through to the higher MAC communication layers. The inventive method protects against errors occurring in the ATM header because the ATM header is always carried in the first TDU. Consequently, misinsertion of ATM cells is also prevented.

BRIEF DESCRIPTION OF THE DRAWINGS

Like reference numbers and designations in the various drawings indicate like elements.

DETAILED DESCRIPTION OF THE INVENTION

Throughout this description, the preferred embodiment and examples shown should be considered as exemplars, rather than as limitations on the present invention.

The preferred embodiment of the present invention is a method and apparatus for data transportation and synchronization in a broadband wireless communication system. An important performance criterion of a broadband wireless communication system, and any communication system for that matter having a physical communication medium shared by a plurality of users, is how efficiently the system uses the physical medium. Because wireless communication systems are shared-medium communication networks, access and transmission by subscribers to the network must be controlled. In wireless communication systems a Media Access Control ("MAC") communication protocol typically controls user accesses to the physical medium. The MAC determines when subscribers are allowed to transmit on the physical medium. In addition, if contentions are permitted, the MAC controls the contention process and resolves any collisions that occur.

Figure 1:
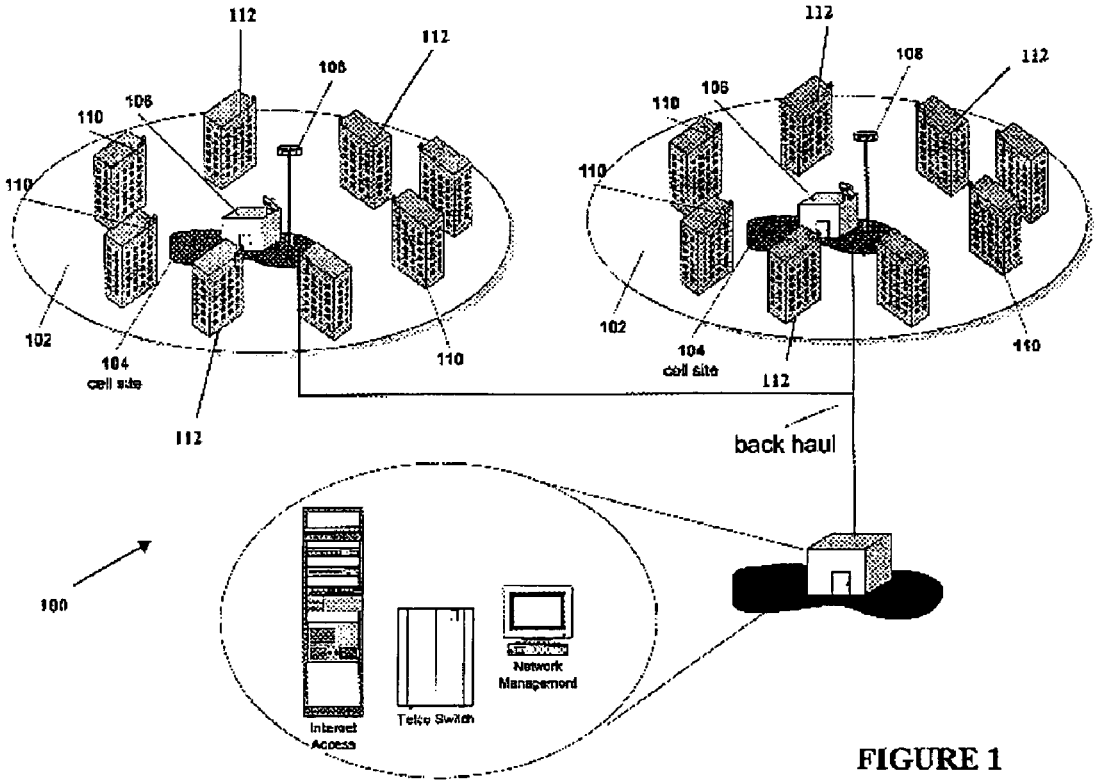
FIG. 1 is a simplified block diagram of a broadband wireless communication system adapted for use with the present invention.

In the system shown in FIG. 1, the MAC is typically executed by software processed by the base stations 106 (in some embodiments, the software may execute on processors both in the base stations and the CPE). The base stations 106 receive requests for transmission rights and grant these requests within the time available taking into account the priorities, service types, quality of service and other factors associated with the CPEs 110. The services provided by the CPEs 110 vary and include TDM information such as voice trunks from a PBX. At the other end of the service spectrum, the CPEs may uplink bursty yet delay-tolerant computer data for communication with the well-known World Wide Web or Internet.

The base station MAC maps and allocates bandwidth for both the uplink and downlink communication links. These maps are developed and maintained by the base station and are referred to as the Uplink Sub-frame Maps and Downlink Sub-frame Maps. The MAC must allocate sufficient bandwidth to accommodate the bandwidth requirements imposed by high priority constant bit rate (CBR) services such as T1, E1 and similar constant bit rate services. In addition, the MAC must allocate the remaining system bandwidth across the lower priority services such as Internet Protocol (IP) data services. The MAC distributes bandwidth among these lower priority services using various QoS dependent techniques such as fair-weighted queuing and round-robin queuing.

The downlink of the communication system shown in FIG. 1 operates on a point-to-multi-point basis (i.e., from the base station 106 to the plurality of CPEs 110). As described in the related U.S. Pat. No.: 6,016,311 which is hereby incorporated by reference herein for its teachings on broadband wireless communication systems, the central base station 106 includes a sectored active antenna array 108 which is capable of simultaneously transmitting to several sectors. In one embodiment of the system 100, the active antenna array 108 transmits to six independent sectors simultaneously. Within a given frequency channel and antenna sector, all stations receive the same transmission. The base station is the only transmitter operating in the downlink direction, hence it transmits without having to coordinate with other base stations, except for the overall time-division duplexing that divides time into upstream (uplink) and downstream (downlink) transmission periods. The base station broadcasts to all of the CPEs in a sector (and frequency). The CPEs monitor the addresses in the received messages and retain only those addressed to them.

The CPEs 110 share the uplink on a demand basis that is controlled by the base station MAC. Depending upon the class of service utilized by a CPE, the base station may issue a selected CPE continuing rights to transmit on the uplink, or the right to transmit may be granted by a base station after receipt of a request from the CPE. In addition to individually addressed messages, the base station may also send messages to multicast groups (control messages and video distribution are examples of multicast applications) as well as broadcast to all CPEs.

Frame Maps—Uplink and Downlink Sub-frame Mappings

In one preferred embodiment of the present invention, the base stations 106 maintain sub-frame maps of the bandwidth allocated to the uplink and downlink communication links. As described in more detail in U.S. Pat. No. : 6,016,311, the uplink and downlink are preferably multiplexed in a time-division duplex (or "TDD") manner. Although the present invention is described with reference to its application in a TDD system, the invention is not so limited. Those skilled in the communications art shall recognize that the present inventive method and apparatus can readily be adapted for use in an FDD system.

In one embodiment adapted for use in a TDD system, a frame is defined as comprising N consecutive time periods or time slots (where N remains constant). In accordance with this "frame-based" approach, the communication system dynamically configures the first $N_1$ time slots (where N is greater than or equal to $N_1$) for downlink transmissions only. The remaining $N_2$ time slots are dynamically configured for uplink transmissions only (where $N_2$ equals $N-N_1$). Under this TDD frame-based scheme, the downlink sub-frame is preferably transmitted first and is prefixed with information that is necessary for frame synchronization.

Figure 2:
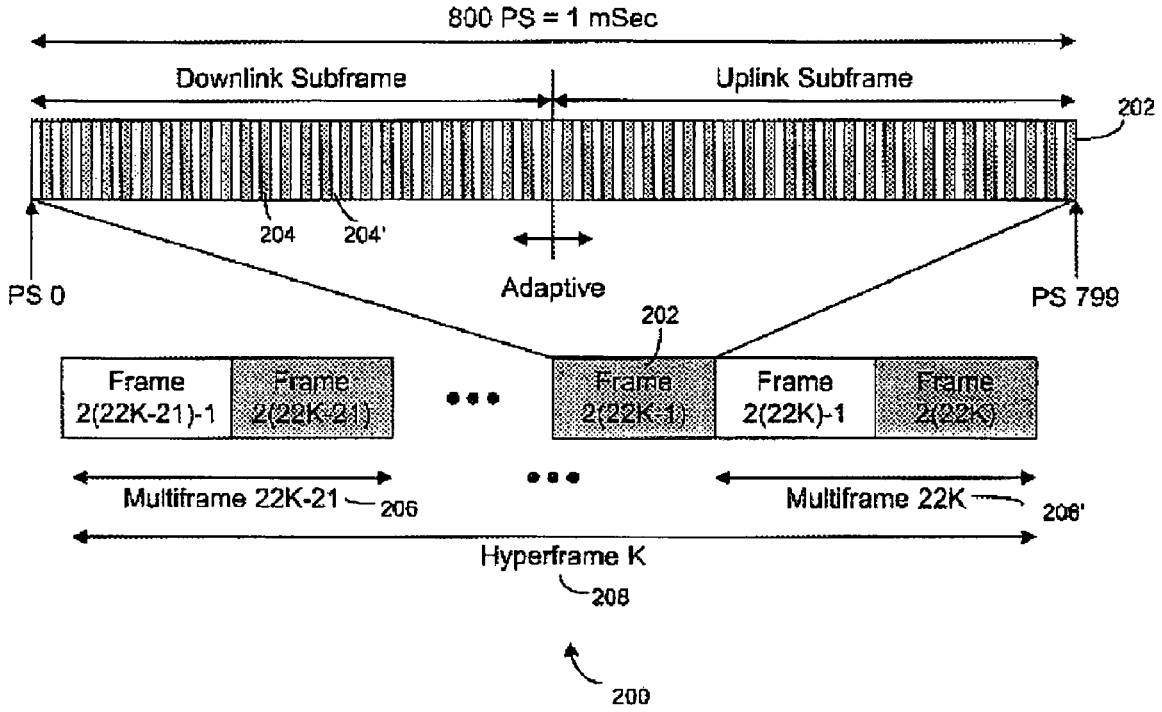
FIG. 2 is a TDD frame and multi-frame structure that can be used by the communication system of FIG. 1 in practicing the present invention.

FIG. 2 shows a TDD frame and multi-frame structure 200 that can be used by a communication system (such as that shown in FIG. 1) in practicing the present invention. As shown in FIG. 2, the TDD frame 200 is subdivided into a plurality of physical slots (PS) 204, 204'. In the embodiment shown in FIG. 2, the frame is one millisecond in duration and includes 800 physical slots. Alternatively, the present invention can be used with frames having longer or shorter duration and with more or fewer PSs. The available bandwidth is allocated by a base station in units of a certain pre-defined number of PSs. Some form of digital encoding, such as the well-known Reed-Solomon encoding method, is performed on the digital information over a pre-defined number of bit units referred to as information elements (PI). The modulation may vary within the frame and determines the number of PS (and therefore the amount of time) required to transmit a selected PI.

As described in more detail in related U.S. Pat. No. : 6,016,311, in one embodiment of the broadband wireless communication system shown in FIG. 1, the TDD framing preferably is adaptive. That is, the number of PSs allocated to the downlink versus the uplink varies over time. The present inventive data transportation and synchronization method and apparatus can be used in both FDD and TDD communication systems. Further, the present invention can be used in both adaptive and fixed TDD systems using a frame and multi-frame structure similar to that shown in FIG. 2. As shown in FIG. 2, to aid periodic functions, multiple frames 202 are grouped into multi-frames 206, and multiple multi-frames 206 are grouped into hyper-frames 208. In one embodiment, each multi-frame 206 comprises two frames 202, and each hyper-frame comprises twenty-two multi-frames 206. Other frame, multi-frame and hyper-frame structures can be used with the present invention. For example, in another embodiment of the present invention, each multi-frame 206 comprises sixteen frames 202, and each hyper-frame comprises thirty-two multi-frames 206. Exemplary downlink and uplink sub-frames used in practicing the present invention are shown respectively in FIGS. 3 and 4.

Downlink Sub-frame Map

Figure 3:
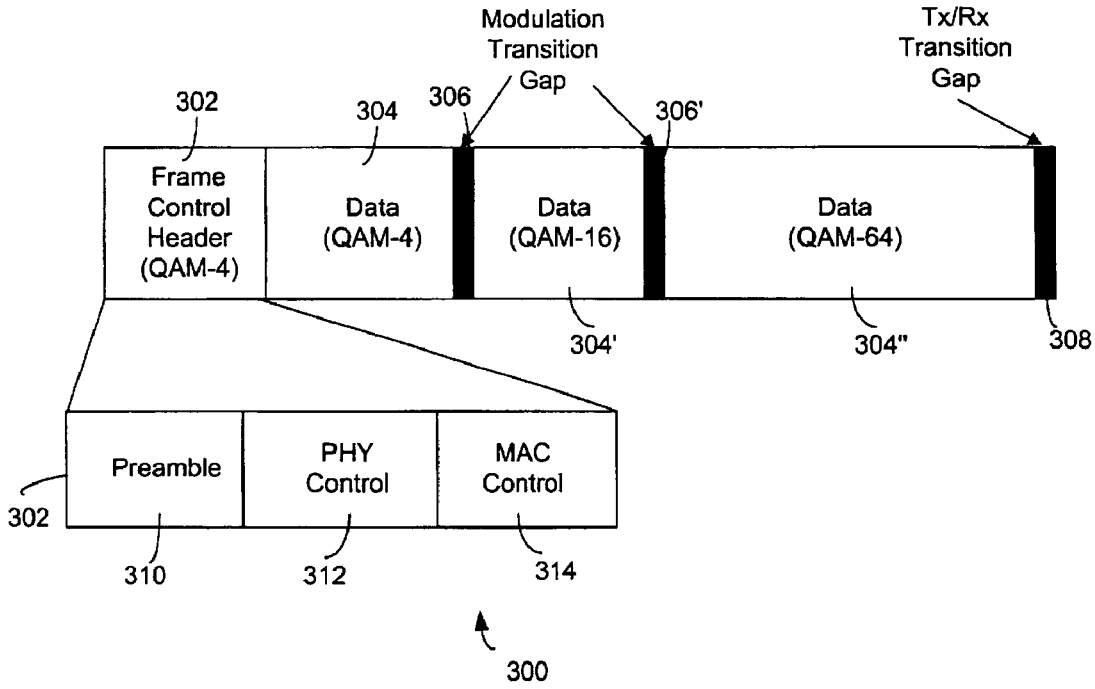
FIG. 3 shows an exemplary downlink sub-frame that can be used by the base stations to transmit information to the plurality of CPEs in the wireless communication of FIG. 1.

FIG. 3 shows one example of a downlink sub-frame 300 that can be used by the base stations 106 to transmit information to the plurality of CPEs 110. The base station preferably maintains a downlink sub-frame map that reflects the downlink bandwidth allocation. The downlink sub-frame 300 preferably comprises a frame control header 302, a plurality of downlink data PSs 304 grouped by modulation type (e.g., PS 304 data modulated using a QAM-4 modulation scheme, PS 304'0 data modulated using QAM-16, etc.) and possibly separated by associated modulation transition gaps (MTGs) 306 used to separate differently modulated data, and a transmit/receive transition gap 308. In any selected downlink subframe any one or more of the differently modulated data blocks may be absent. In one embodiment, modulation transition gaps (MTGs) 306 are 0 PS in duration. As shown in FIG. 3, the frame control header 302 contains a preamble 310 that is used by the physical protocol layer (or PHY) for synchronization and equalization purposes. The frame control header 302 also includes control sections for both the PHY (312) and the MAC (314).

The downlink data PSs are used for transmitting data and control messages to the CPEs 110. This data is preferably encoded (using a Reed-Solomon encoding scheme for example) and transmitted at the current operating modulation used by the selected CPE. Data is preferably transmitted in a pre-defined modulation sequence: such as QAM-4, followed by QAM-16, followed by QAM-64. The modulation transition gaps 306, if present, are used to separate the modulation schemes used to transmit data. The PHY Control portion 312 of the frame control header 302 preferably contains a broadcast message indicating the identity of the PS 304 at which the modulation scheme changes. Finally, as shown in FIG. 3, the Tx/Rx transition gap 308 separates the downlink sub-frame from the uplink sub-frame.

Uplink Sub-frame Map

Figure 4:
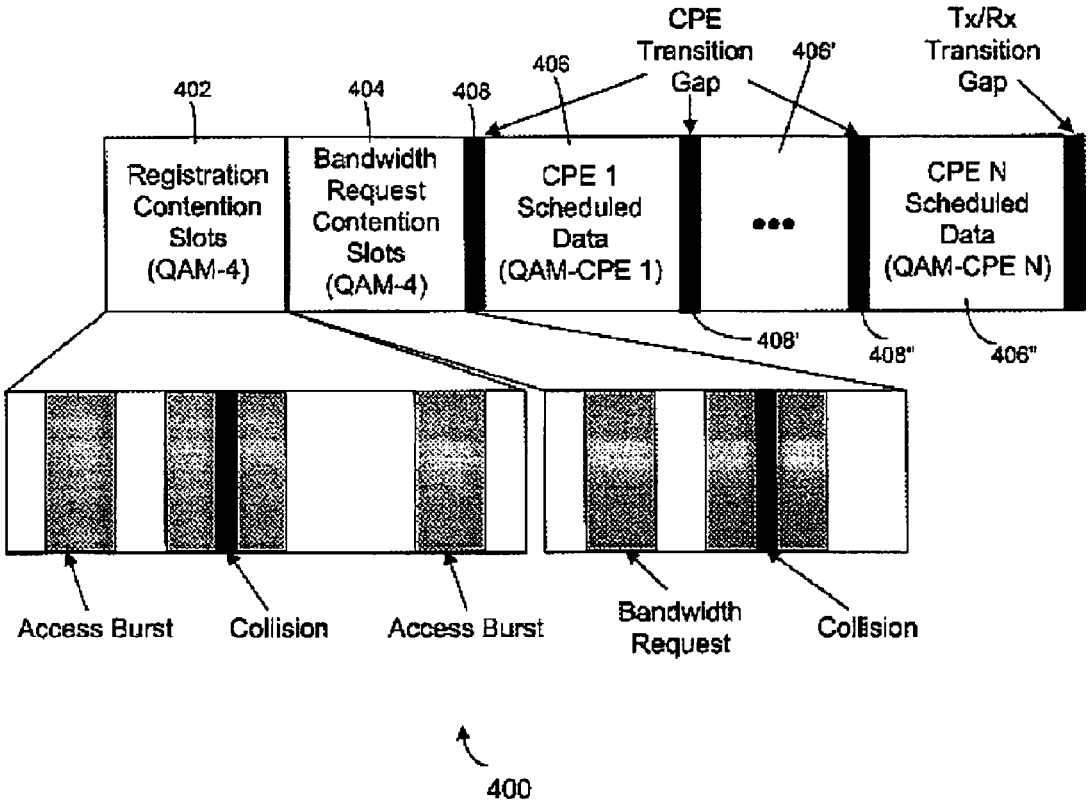
FIG. 4 shows an exemplary uplink sub-frame that is adapted for use with the present data transportation and synchronization invention.

FIG. 4 shows one example of an uplink sub-frame 400 that is adapted for use with the present data transportation and synchronization invention. In accordance with the present data transportation and synchronization method and apparatus, the CPEs 110 (FIG. 1) use the uplink sub-frame 400 to transmit information (including bandwidth requests) to their associated base stations 106. As shown in FIG. 4, there are three main classes of MAC control messages that are transmitted by the CPEs 110 during the uplink frame: (1) those that are transmitted in contention slots reserved for CPE registration (Registration Contention Slots 402); (2) those that are transmitted in contention slots reserved for responses to multicast and broadcast polls for bandwidth allocation (Bandwidth Request Contention Slots 404); and those that are transmitted in bandwidth specifically allocated to individual CPEs (CPE Scheduled Data Slots 406).

The bandwidth allocated for contention slots (i.e., the contention slots 402 and 404) is grouped together and is transmitted using a pre-determined modulation scheme. For example, in the embodiment shown in FIG. 4 the contention slots 402 and 404 are transmitted using a QAM-4 modulation. The remaining bandwidth is grouped by CPE. During its scheduled bandwidth, a CPE 110 transmits with a fixed modulation that is determined by the effects of environmental factors on transmission between that CPE 110 and its associated base station 106. The uplink sub-frame 400 includes a plurality of CPE transition gaps (CTGs) 408 that serve a similar function to the modulation transition gaps (MTGs) 306 described above with reference to FIG. 3. That is, the CTGs 408 separate the transmissions from the various CPEs 110 during the uplink sub-frame 400. In one embodiment, the CTGs 408 are 2 physical slots in duration. A transmitting CPE preferably transmits a 1 PS preamble during the second PS of the CTG 408 thereby allowing the base station to synchronize to the new CPE 110. Multiple CPEs 110 may transmit in the registration contention period simultaneously resulting in collisions. When a collision occurs the base station may not respond. The downlink and uplink sub-frames provide a mechanism for layered data transportation in a wireless communication system.

Layered Data Transport Architecture in a Broadband Wireless Communication System An important feature of the present invention is the ability to abstract higher communication protocol layers (Continuous Grant ("CG") and Demand Assigned Multiple Access ("DAMA")). In one preferred embodiment of the present invention, the base stations 106 maintain a layered data transport architecture between the service access point (SAP) and the physical data through a MAC. The various SAPs have different communication protocols and latency requirements. At the highest level of abstraction, a CG data service such as T1 typically requires a great deal of bandwidth having well-controlled delivery latency. In contrast, a DAMA data service such as Internet Protocol data services (TCP/IP) are bursty, often idle (which at any one instant requires zero bandwidth), and are relatively insensitive to delay variations when active. The layered data transport architecture provides a mechanism for interfacing with various SAPs in a broadband wireless communication system.

Figure 5:
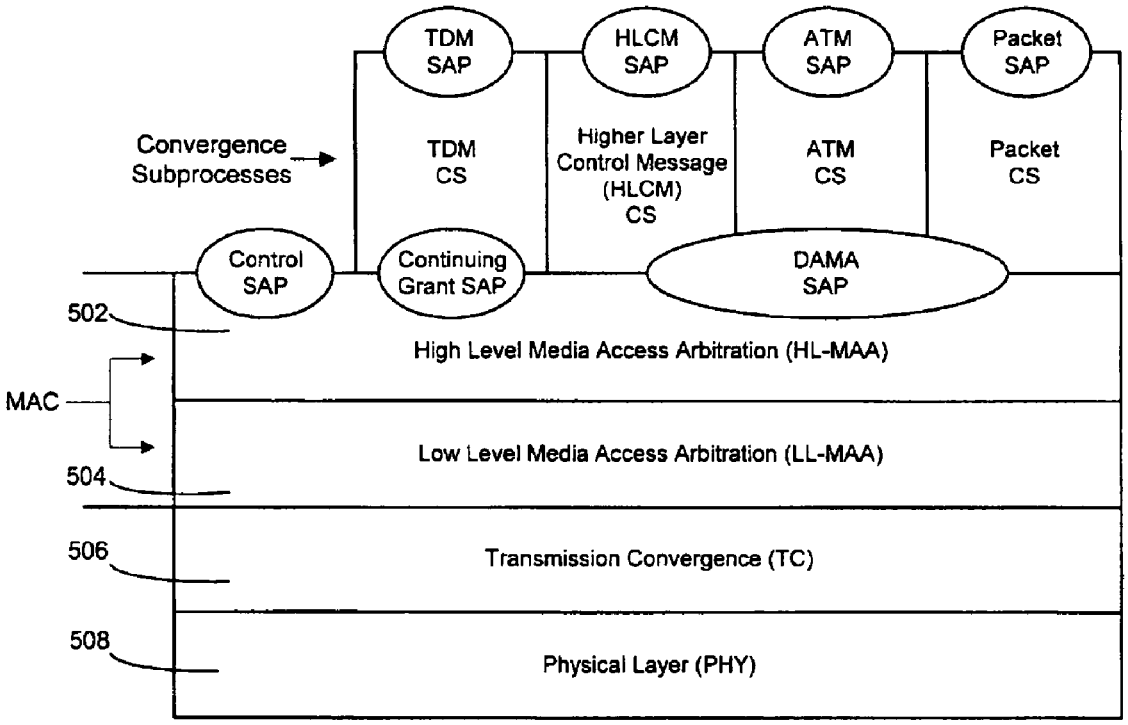
FIG. 5 shows an exemplary data transport architecture for use by the communication system of FIG. 1 in practicing the present invention.

FIG. 5 shows a preferred embodiment of a data transport architecture for use with the present invention. As shown in FIG. 5, the Convergence Subprocesses (CS) layers and the MAC layers 502, 504 interface to transport data across a broadband wireless communication system. The Convergence Subprocesses and their Service Access Points provide the interfaces to higher communication protocol layers for service specific connection establishment, maintenance and data transfer. Convergence Subprocesses of data are well-known in the art. One such Convergence Subprocess is described in a text entitled "Asynchronous Transfer Mode (ATM), Technical Overview", second Edition, Harry J. R. Dutton and Peter Lenhard, published by Prentice Hall, October 1995, at pp. 3-21 through 3-25, hereby incorporated herein by reference for its teachings on Convergence Subprocesses. The ATM Convergence Sub-process (and related Segmentation and Reassembly (SAR) Process) is described in greater detail below with reference to FIG. 12. The MAC provides SAPs to the higher layers of communication protocol such as Time Division Multiplexing (TDM), Higher Layer Control Message (HLCM), Continuing Grant (CG) and Demand Assigned Multiple Access (DAMA). As shown in FIG. 5, the MAC preferably has two layers, the High Level Media Access Arbitration (HL-MAA) layer 502 and the Low Level Media Access Arbitration (LL-MAA) layer 504.

In one preferred embodiment, the HL-MAA 502 provides multiple functions. The HL-MAA 502 preferably interfaces with the higher protocol layers for Base Station (BS) control, CPE registration, the establishment and maintenance of data connections, and load leveling functions. Through the convergence sublayers, the BS HL-MAA interacts with the higher layers in the BS, accepting or rejecting requests for provisioned connections at varying levels of service based upon both bandwidth availability and connection specific bandwidth limits. The HL-MAA 502 also preferably provides load leveling across the physical channels of data. The BS HL-MAA sublayer of the MAC also preferably controls bandwidth allocation and load leveling across physical channels. The BS HL-MAA is aware of the loading on all physical channels within this MAC domain. Existing connections may be moved to another physical channel to provide a better balance of the bandwidth usage within a sector.

In the preferred embodiment, the LL-MAA 504 provides an interface between the CPE and the BS MAC. The LL-MAA 504 preferably performs the bandwidth allocation on an individual physical channel. Each physical channel has a corresponding instance of the BS LL-MAA. Similarly, each CPE has a corresponding instance of the CPE LL-MAA. Thus, the LL-MAA is more tightly coupled with the Transmission Convergence (TC) 506 and the physical (PHY) 508 layers than is the HL-MAA. The BS LL-MAA preferably cooperates with the BS HL-MAA in determining the actual amount of bandwidth available at any given time based upon bandwidth requests, control message needs and the specific modulation used to communicate with each CPE. The BS LL-MAA preferably packages downlink data for transmission to the CPEs. The CPE LL-MAA preferably packages uplink data using the same bandwidth allocation algorithm as the BS LL-MAA except limited in scope to the CPE's allocated bandwidth. The LL-MAA 504 may fragment messages across multiple time division duplexing (TDD) frames.

The present data transportation and synchronization invention relies upon fixed length transmission convergence/physical TC/PHY packets to transport variable length MAC packets that are relatively de-coupled from the physical (PHY) layer 508. The transmission convergence (TC) layer 506 provides a de-coupling means between the MAC layers 502, 504 and the PHY layer 508. As described in more detail below in the TC/PHY Packet Format and MAC Packet and Header Format sections, the preferred embodiment of the present invention uses variable length MAC packets and fixed length TC/PHY packets. The preferred embodiment of the present invention preferably also uses downlink and uplink sub-frame maps in transporting data from the BS to one of the various CPEs. In the preferred embodiment, the MAC preferably uses an adaptive frame structure to transfer data as described above and in co-pending application Ser. No. 09/316,518. The data transported by the adaptive frame structure comprises a set of formatted information or "packets". One MAC packet format adapted for use in the present invention is described below. One of ordinary skill in the art will recognize that alternative MAC packet formats may be used without departing from the spirit of the present invention.

MAC Packet Format—Header and Payload

MAC packet data represents data exchanged between the higher communication protocol layers (e.g., CG and DAMA) and the lower communication protocol layers (e.g., TC and PHY) in a wireless communication system. In a preferred embodiment of the present invention, the data for all applications is transmitted in packets prefaced with a header containing the connection ID and a variety of status bits. The connection ID provides a mechanism for user stations to recognize data that is transmitted to them by a base station. The user stations process the packets appropriately based on information referenced by the connection ID.

MAC data may be fragmented across TDD frames 200. In a preferred embodiment, this fragmentation is accomplished using MAC headers. The MAC headers are used to control fragmentation across TDD frames 200 and to handle control and routing issues. The preferred minimum fragment size and the fragmentation step size are given to the CPE in a "Registration Results" message. "Begin" and "Continue" fragments preferably should be at least the minimum fragment size. If larger, the additional size preferably should be a multiple of the fragmentation step size. End fragments and unfragmented MAC packets are preferably exempt from the fragmentation minimum and step size requirements.

Within a TDD frame 200, data sent on a connection by the MAC may be unfragmented (transmitted within a single TDD frame 200) or may comprise a beginning packet and an end packet, separated by some number of continuation packets. In the preferred embodiment of the present invention, the format of a MAC packet comprises a header and a payload. The MAC header preferably comprises two distinct formats: a standard MAC header and an abbreviated MAC header. These two header formats are preferably mutually exclusive because a particular network of base stations and CPEs will preferably use either the standard MAC header only or the abbreviated MAC header only. The standard MAC header supports variable length data packets over the data or air interface. The abbreviated MAC header supports fixed length data packets over the data or air interface. The preferred downlink MAC headers vary slightly from the preferred uplink MAC headers.

Figure 6A:
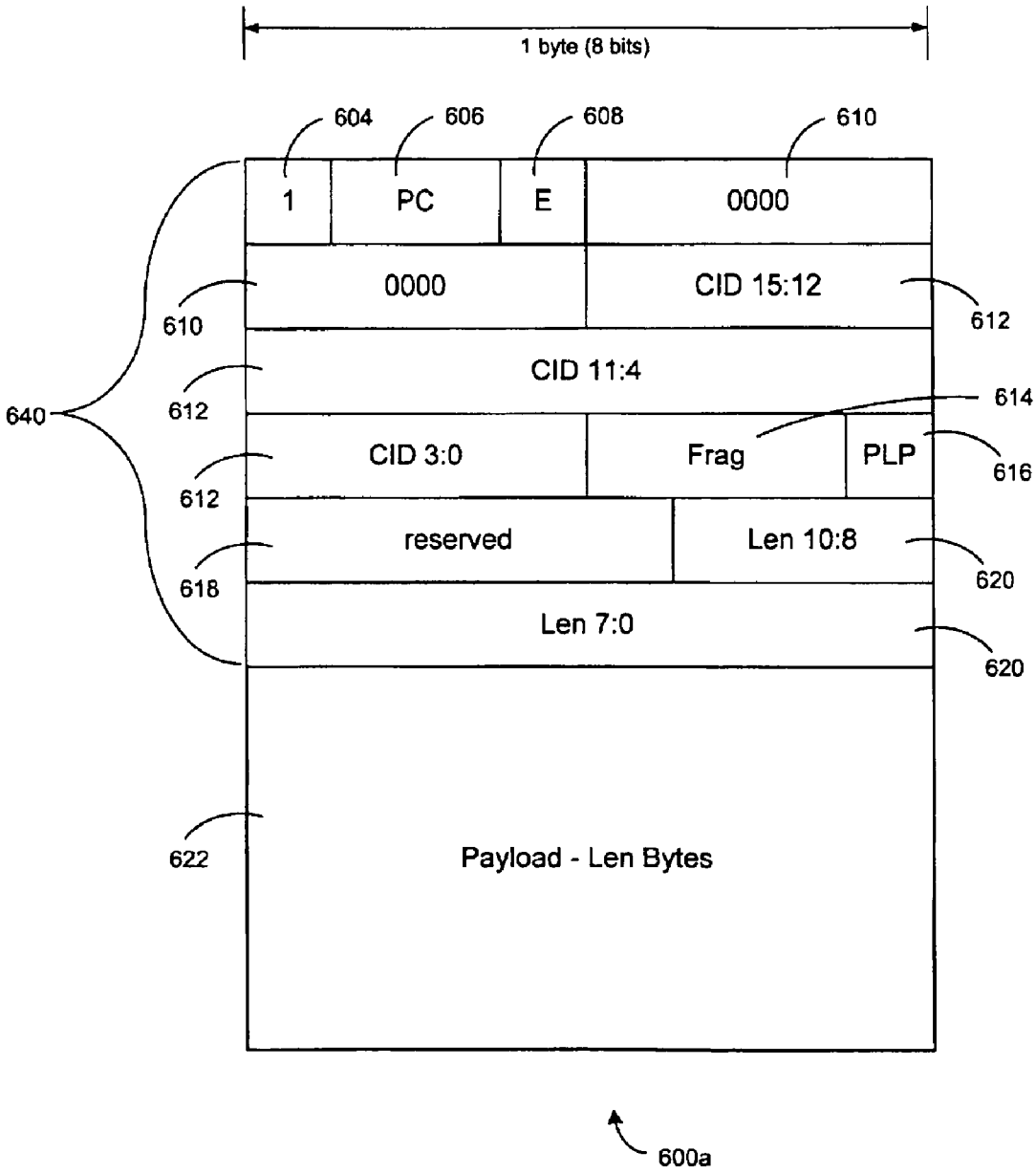
FIG. 6a shows an exemplary variable length MAC downlink packet format for use by the communication system of FIG. 1 in practicing the present invention.

FIG. 6a shows the format of the preferred embodiment of a standard MAC downlink packet format 600a adapted for use with the present invention. Although specific fields, field lengths, and field configurations are described with reference to FIG. 6a, those skilled in the communications art shall recognize that alternative configurations may be used in practicing the present invention. The standard MAC downlink packet format 600a preferably comprises a standard MAC downlink header 640 and a variable length payload 622. The standard MAC downlink header 640 preferably comprises 9 different fields that measure 6 bytes in total length. The standard MAC downlink header 640 begins with a header flag field 604 that is preferably 1 bit in length. In the embodiment shown the header flag field 604 is set to a logical one in systems that only allow variable length packets. Thus, the header flag field 604 is always set to a logical one for the standard MAC downlink header 640 because the standard MAC header supports variable length data packets. The header flag field 604 is followed by a power control (PC) field 606.

The power control field 606 provides fast, small adjustments in a CPE's power and preferably is 2 bits in length. The power control field 606 preferably adjusts the CPE's power in relative rather than absolute amounts. In the preferred embodiment, the 2 bits of the power control field 606 are assigned the following logical values: 00, do not change power; 01, increase power a small amount; 11, decrease power a small amount; 10, reserved for future use. An encryption (E) bit field 608 preferably follows the power control field 606. The encryption bit field 608 provides information about the payload and is 1 bit in length. When the payload is encrypted, the encryption bit field 608 is set to a logical one, otherwise, to a logical zero. The MAC header is always transmitted unencrypted. The encryption bit field 608 is followed by a connection ID reserved field 610. The connection ID reserved field 610 provides means for future expansion of a connection ID (CID) field 612 (described below) and is 8 bits in length. The connection ID field 612 follows the connection ID reserved field 610 and provides identification information to the CPEs. The connection ID field 612 is 16 bits in length. The connection ID is a destination identifier established at the time of connection between a base station and a CPE to uniquely identify the CPE. A fragmentation control field 614 follows the connection ID field 612.

The fragmentation control (Frag) field 614 provides fragmentation information and is 3 bits in length. When a system supports variable length packets (ie., standard MAC downlink format), the MAC performs fragmentation to efficiently use the air link bandwidth. In the preferred embodiment, the 3 bits of the fragmentation control field 614 are preferably assigned the following values: 010, begin fragment of a fragmented message; 000, continue fragment of a fragmented message; 100 end fragment of a fragmented message; 110 unfragmented message. A packet loss priority (PLP) field 616 follows the fragmentation control field 614. The packet loss priority field 616 provides information regarding congestion and is 1 bit in length. In a congestion situation the wireless communication system first discards packets having low priority. The wireless communication system sets the packet loss priority field 616 set to a logical one for a low priority packet. Conversely, a packet loss priority field 616 for a high priority packet is set to a logical zero. A length reserved (Len) field 618 follows the packet loss priority field.

The length reserved field 618 preferably is 5 bits in length and provides means for future expansion of a length field 620 (described below in more detail). The length field 620 follows the length reserved field 618 and provides information on the MAC packet payload. The length field 620 is 11 bits in length and indicates the number of bytes in the MAC packet payload. A payload field 622 follows the length field 620. The payload field 622 is a variable length field determined by the length field 620. The payload field 622 contains a portion of a data element from a data service type specific (e.g., T1, TCP/IP). These data elements are transported to a CPE identified by the connection ID field 612. The abbreviated MAC downlink packet format 600b is similar to the standard MAC downlink packet format 600a.

Figure 6B:
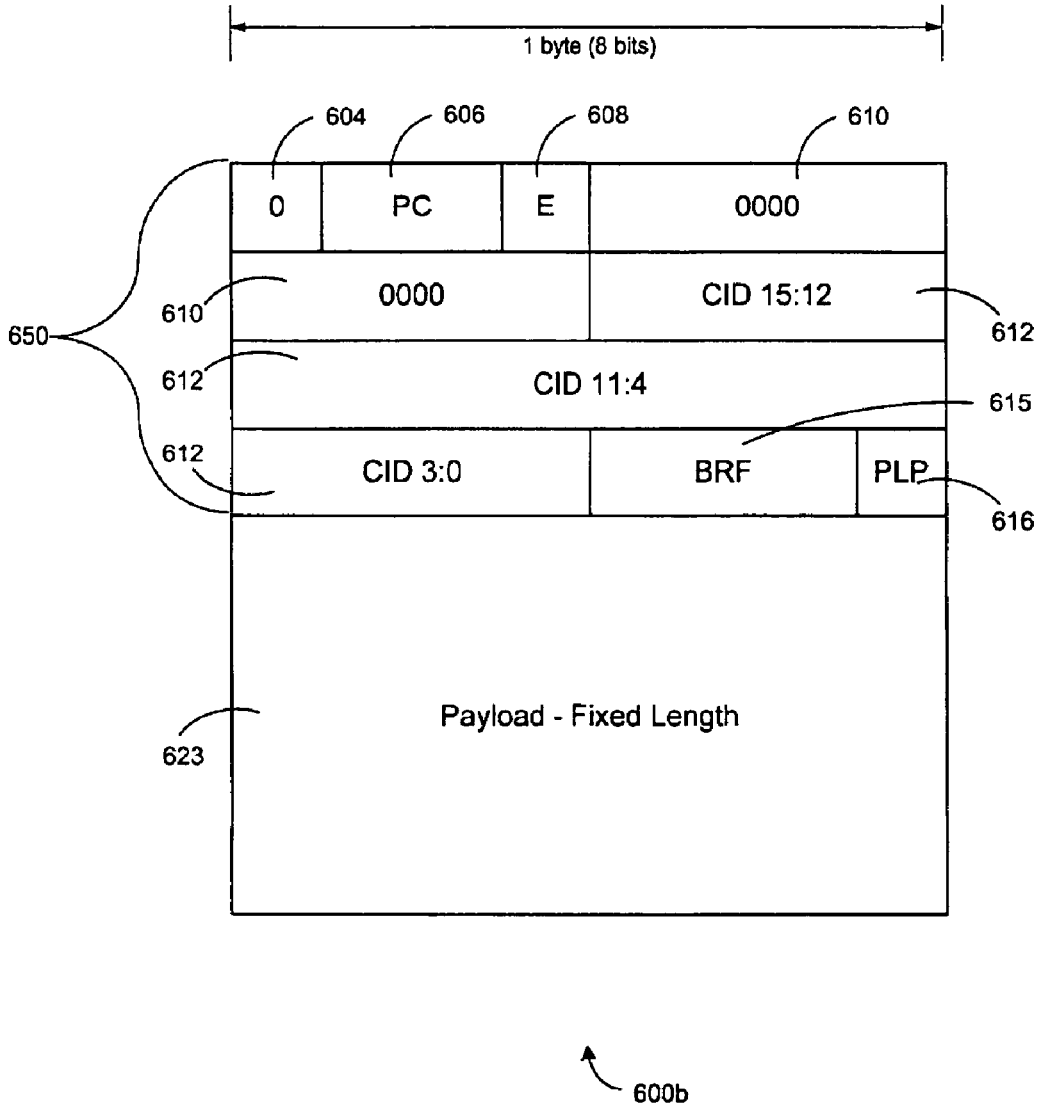
FIG. 6b shows an exemplary fixed length MAC downlink packet format for use by the communication system of FIG. 1 in practicing the present invention.

FIG. 6b shows the format of the preferred embodiment of an abbreviated MAC downlink packet format 600b adapted for use with the present invention. Those skilled in the communications art shall recognize that alternative configurations can be used without departing from the scope of the present invention. The abbreviated MAC downlink packet format 600b preferably comprises an abbreviated MAC downlink header 650 and a fixed length payload 623.

The abbreviated MAC downlink header 650 preferably comprises 7 different fields that measure 4 bytes in total length. The abbreviated MAC downlink header 650 begins with a header flag field 604 that is 1 bit in length. The header flag field 604 is set to a logical zero in systems that only allow fixed length packets. Thus, in the embodiment shown, the header flag field 604 is always set to a logical zero for the abbreviated MAC downlink header 650 because the abbreviated MAC header supports fixed length data packets. The header flag field 604 is followed by the power control field 606, the encryption bit field 608, the reserved connection ID field 610, and the connection ID field 612. These fields are identical to those described above in the description of the standard MAC downlink packet and header format 600a of FIG. 6a. The connection ID field 612 is followed by the backhaul reserved fragmentation (BRF) field 615 and preferably is 3 bits in length. The BRF field 615 is reserved for backhaul fragmentation and is preferably used to pass through backhaul specific fragmentation information. The above-described PLP 616 field follows the BRF field 615.

The standard MAC uplink packet format 600c is similar to the standard MAC downlink packet format 600a and is described below.

Figure 6C:
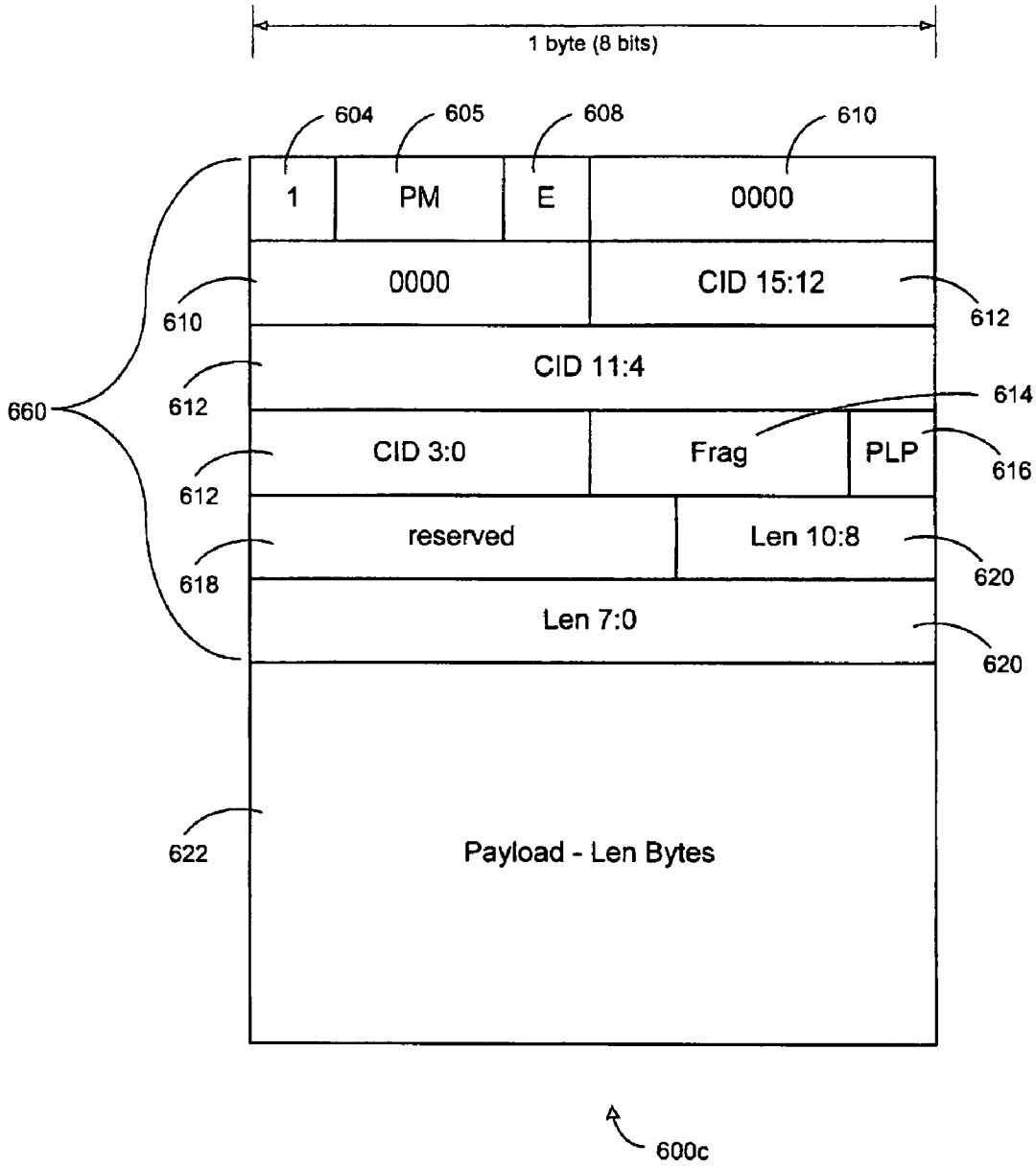
FIG. 6c shows an exemplary variable length MAC uplink packet format for use by the communication system of FIG. 1 in practicing the present invention.

FIG. 6c shows the format of the preferred embodiment of a standard MAC uplink packet format 600c adapted for use with the present invention. Those skilled in the communications art shall recognize that alternative configurations can be used without departing from the scope of the present invention. The standard MAC uplink packet format 600c of FIG. 6c preferably comprises a standard MAC uplink header 660 and a variable length payload 622. The standard MAC uplink header 660 format (FIG. 6c) is identical to the standard MAC downlink header 640 format (FIG. 6a) with one exception. That is, in the standard MAC uplink header 660 a poll me (PM) field 605 follows the header flag 604 instead of the power control field 606 (FIG. 6a). The poll me field 605 is 3 bits in length and indicates when a request is to be polled for bandwidth. The poll me field 605 also indicates when connection requests are received from the CPE associated with the packet. In the preferred embodiment, the poll me field 605 is assigned the following logical values: 01, request to be polled for a connection with Quality of Service (QoS) between a first selected level and 255; 10, request to be polled for a connection with QoS between 1 and a second selected level. The abbreviated MAC uplink packet format 600d shown in FIG. 6d is similar to the abbreviated MAC downlink packet format 600b of FIG. 6b.

Figure 6D:
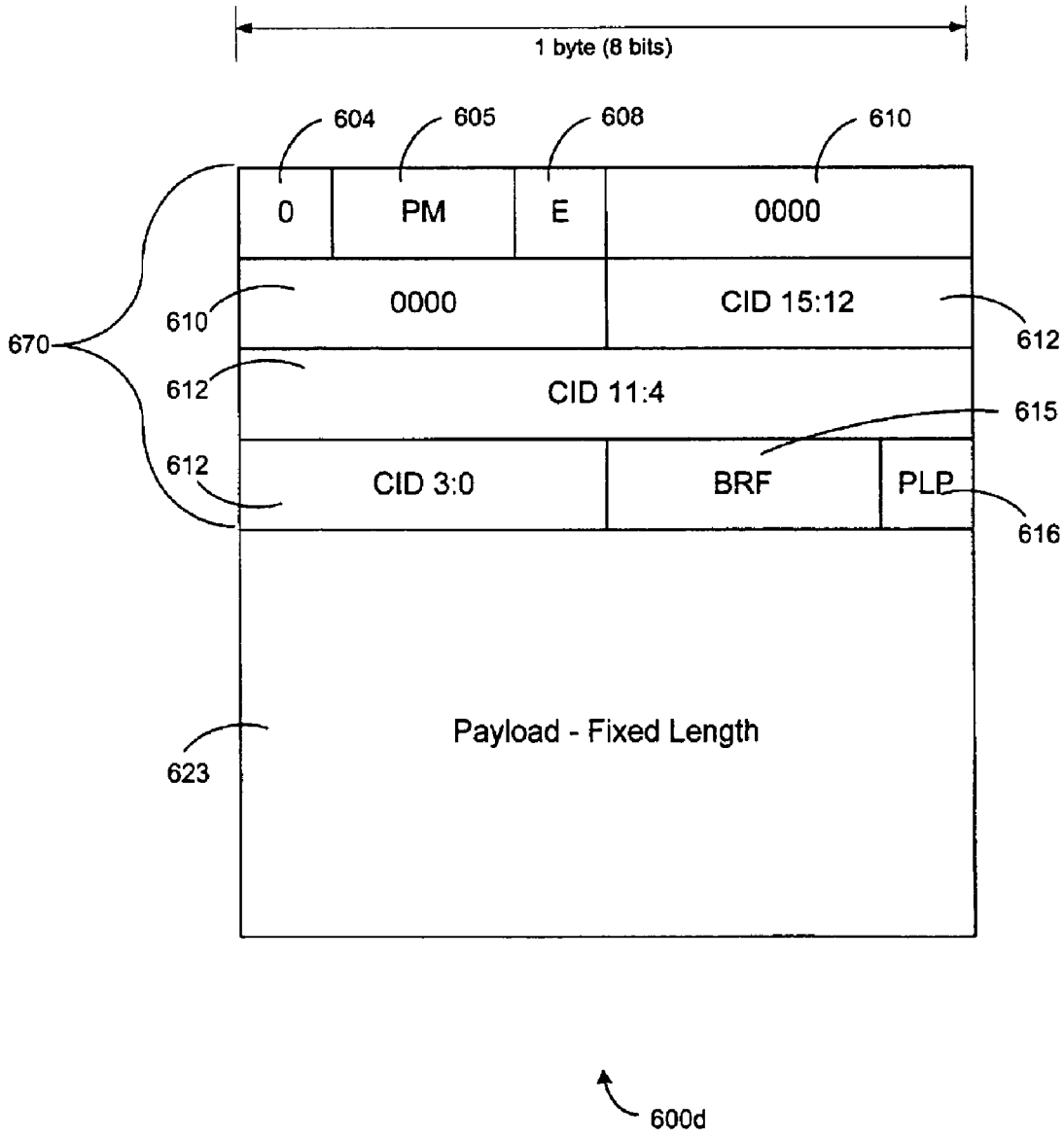
FIG. 6d shows an exemplary fixed length MAC uplink packet format for use by the communication system of FIG. 1 in practicing the present invention.

FIG. 6d shows the format of the preferred embodiment of an abbreviated MAC uplink packet 600d adapted for use with the present invention. The abbreviated MAC uplink packet 600d preferably comprises an abbreviated MAC uplink header 670 and a fixed length payload 623. The abbreviated MAC uplink header 670 format is identical to the abbreviated MAC downlink header 650 format of FIG. 6b with one exception. Specifically, in the abbreviated MAC uplink header 670 of FIG. 6d, a poll me field 605 is used instead of the power control field 606 of the MAC downlink header 650 format (FIG. 6b). The poll me field 605 follows the header flag 604 as shown in FIG. 6d. The poll me field 605 is described above with reference to the standard MAC uplink packet format 600c of FIG. 6c.

The MAC uplink and downlink packet formats 600a, 600b, 600c, 600d described above with reference to FIGS. 6a-6d are the preferred mechanisms to transport data between the CPEs and the base stations in a wireless communication system adapted for use with the present invention. However, this is not meant to limit the present invention. One of ordinary skill in the art shall recognize that other types of MAC packet formats 600a, 600b, 600c, 600d can be adapted for use without departing from the spirit and scope of the present invention.

In the preferred embodiment of the present invention, the MAC uplink and downlink packets interface with the physical layer 508 (FIG. 5) through the TC layer 506 (FIG. 5). The TC layer 506 packages MAC messages into packets that are compatible with the air interface. The TC layer 506 distributes MAC messages across TC/PHY packets as required. As one of ordinary skill in the communications art shall recognize, a great number of formats exist for transporting data in a TC/PHY packet. One TC/PHY packet format adapted for use in the present invention is now described with reference to FIG. 7.

TC/PHY Packet Format

Figure 7:
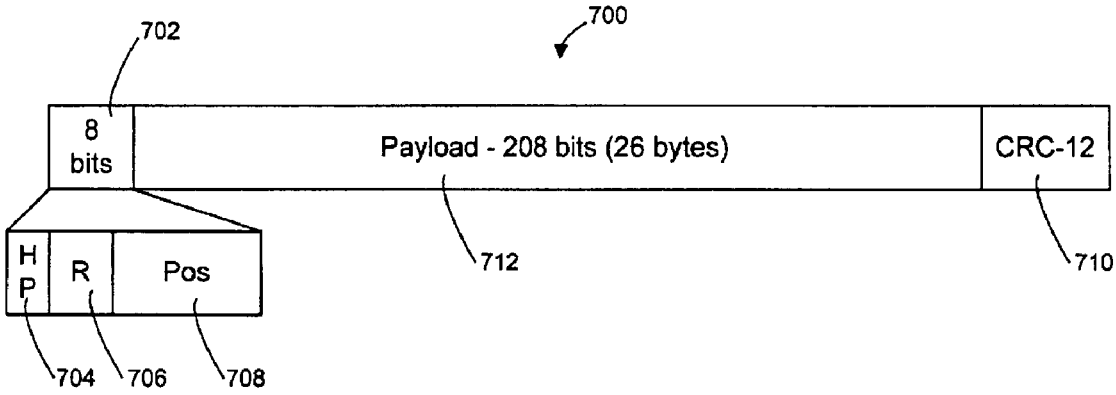
FIG. 7 shows an exemplary TC/PHY packet that is adapted for use with the present invention.

FIG. 7 shows the format of a preferred embodiment of a TC/PHY packet 700 adapted for use with the present invention. The TC/PHY packet format 700 preferably comprises 5 different fields that measure 228 bits in total length. The TC/PHY packet 700 is also referred to as the "TC Data Unit" (TDU). As shown in FIG. 7, the preferred embodiment of the TC/PHY packet 300 comprises an 8-bit header 702, a 208-bit payload field 712 and a 12-bit CRC field 710. The header 702 further preferably comprises three fields: a header present (HP) field 704, a reserved (R) field 706, and a position field (Pos) 708. The header present field 704 is 1 bit in length and provides information about the presence (or absence) of the start of a MAC header present within the TC/PHY packet 700. When a MAC header starts somewhere within the TC/PHY packet 700, the header present field 704 is set to a logical one, otherwise, it is set to a logical zero. The reserved field 706 follows the header present field 704. The reserved field 706 is 2 bits in length and is optionally reserved for future use. The position field 708 follows the reserved field 706. The position field 708 is 5 bits in length and preferably indicates the byte position within the payload at which the MAC header, if present, starts. The TC/PHY packet 700 preferably has a payload 712 of 208 bits (i.e., 26 bytes). The payload 712 contains MAC packet information that is described in more detail below. The CRC field 710 as shown in FIG. 7 follows the payload 712. The CRC field 710 is 12 bits in length. The CRC field 710 is used to perform an error correction function using a well known Cyclic Redundancy Check technique. The TC/PHY packet format 700 (TDU) provides a mechanism for mapping of MAC entities (packets) to PHY elements. This mechanism is now described in more detail.

Mapping of MAC Entities to PHY Elements

In one embodiment of the present invention, the BS LL-MAA performs all allocation and mapping of the available bandwidth of a physical channel based on the priority and quality of services requirements of requests received from the higher communication protocol layers. Additionally, the availability of bandwidth is preferably based on the modulation required to achieve acceptable bit error rates (BER) between the BS and the individual CPEs. The BS MAC preferably uses information from the PHY regarding signal quality to determine the modulation required for a particular CPE and, therefore, the bandwidth that is available. Once the BS LL-MAA has allocated uplink bandwidth to the CPEs, each CPE's LL-MAA, in turn, allocates that bandwidth to the uplink requests it has outstanding.

Figure 8:
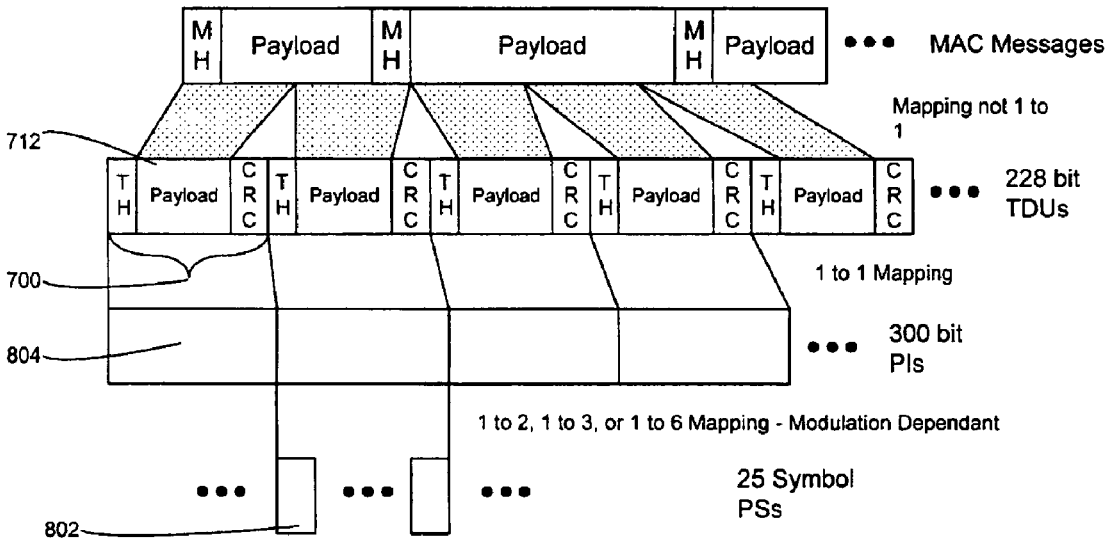
FIG. 8 shows an exemplary four-stage mapping of MAC packets to the PHY layer in accordance with the present invention.

FIG. 8 shows a preferred embodiment of a four-stage mapping from a stream of variable length MAC messages to a 228-bit TC Data Unit (TDU) 700, otherwise known as a TC/PHY packet 700, to a 300-bit PIs and finally to a 25-symbol PSs (PIs and PSs are described above with reference to FIG. 2). As shown in FIG. 8 and described further below, the present invention preferably maps from the PS communication protocol level to the MAC communication protocol level, and vice versa. The preferred minimum physical unit that the LL-MAA allocates is the 25-symbol PS 802. The preferred minimum logical unit the LL-MAA allocates is the 208-bit (26-byte) payload 712 of the 228-bit TC Data Unit (TDU) 700. As one of ordinary skill in the communications art will recognize, other minimums of the physical and logical units can be used without departing from the scope of the present invention. The 228-bit TDU 700 is preferably encoded using the well-known Reed-Solomon coding technique to create the 300-bit PIs 804. Bandwidth needs that do not require encoding, such as the various transition gaps, are preferably allocated in units of 1 PS. Bandwidth needs that require encoding (using a Reed-Solomon encoding scheme, for example) are preferably allocated in TDUs 700, with each modulation, on the downlink, and each CPE's transmission, on the uplink, padded to an integer multiple of TDUs 700 to create an integer multiple of PIs 804. This padding in the preferred embodiment is described in more detail in the following subsections. The number of PSs 802 required to transmit a PI varies with the modulation scheme used.

Downlink Mapping of MAC to PHY

As described above and in co-pending and incorporated application Ser. No. 09/316,518, the preferred embodiment of a downlink sub-frame 300 adapted for use with the present invention starts with a Frame Control Header 302 (FIG. 3) that contains a preamble of a fixed length 310, a PHY control section 312 and a MAC control section 314. This Frame Control Header 302 allows CPEs to synchronize with the downlink and determine the mapping of the uplink and the downlink.

Figure 9:
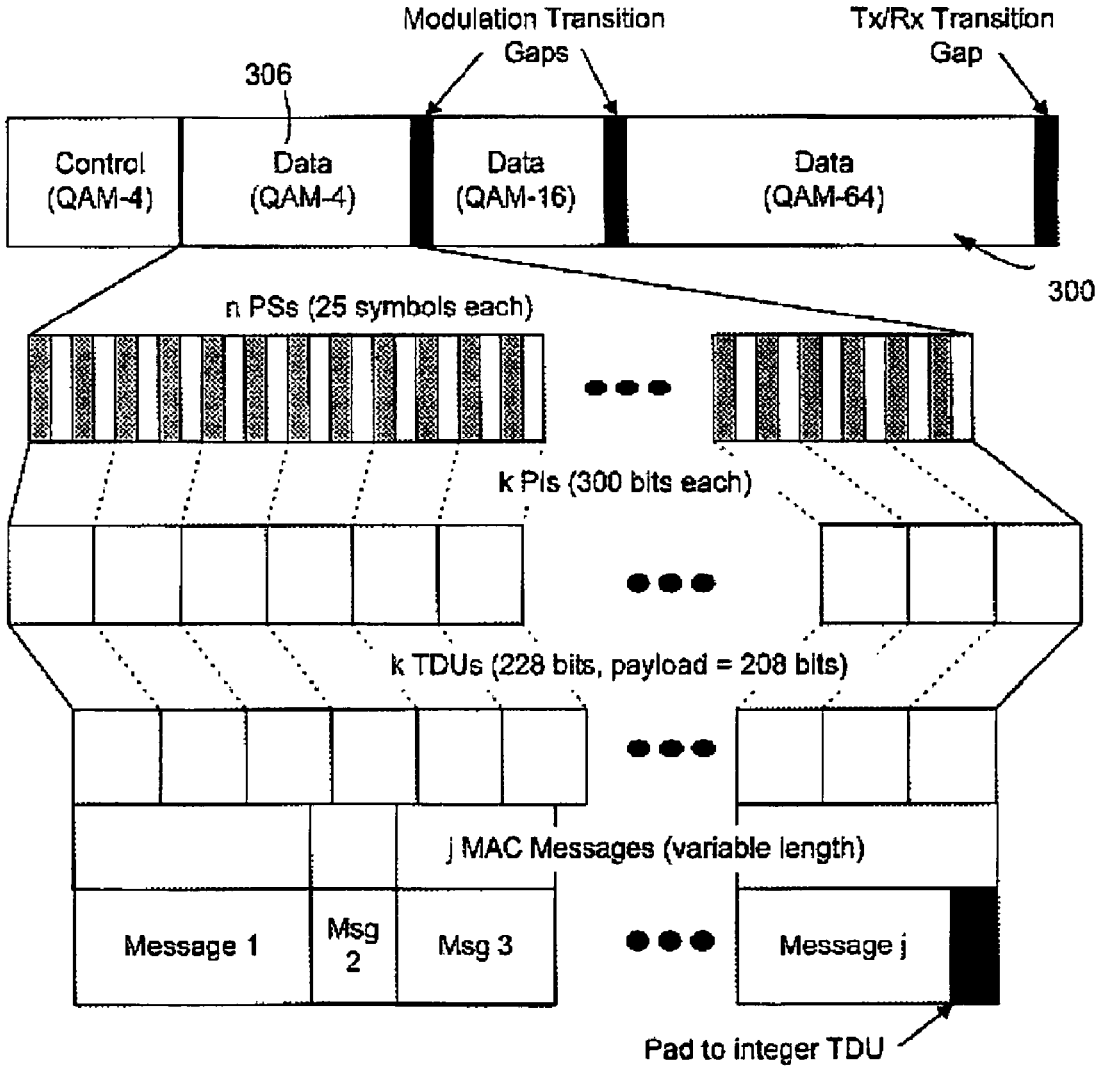
FIG. 9 shows an exemplary downlink mapping of MAC messages to PHY elements in accordance with the present invention.

FIG. 9 shows the mapping of the body of the preferred downlink sub-frame 300 to the downlink needs of users in a preferred embodiment of the present invention. The Modulation Transition Gap (MTG) 306 serves the purpose of a 1 PS preamble to ensure synchronization with changing modulation techniques. Within the sub-frame 300, TC/PHY packets 700 are preferably grouped by modulation (e.g., QAM4, QAM-16, and QAM-64). Within the modulation blocks, packets can be grouped by CPE, but do not need to be grouped as such. All messages (other than in the frame header) for an individual CPE are preferably transmitted using the same modulation scheme. In the mapping method of the preferred embodiment, each series of MAC packets at a particular modulation should be padded to be an integer multiple of a TDU 700. This padding is used to provide an integer multiple of a PI after coding. The padding preferably uses the fill byte 0×55. The structure of uplink mapping differs slightly from downlink mapping. This structure is now described with reference to FIGS. 4 and 10.

Uplink Mapping of MAC to PHY

The uplink sub-frame 400 (FIG. 4) adapted for use in the present invention preferably comprises uplink contention access slots as described above with reference to FIG. 4. The uplink sub-frame 400 preferably begins with optional registration contention slots 402. Some registration contention slots 402 are preferably allocated periodically to the PHY for use during station registration. In one preferred embodiment, registration messages are proceeded by a 1 PS preamble and are preferably sent alone. Also, other MAC control messages are preferably not packed into the same MAC packet. The bandwidth request retention slots 404 are preferably allocated for responses to multicast and broadcast polls for bandwidth requirements. In one preferred embodiment, the bandwidth request messages, when transmitted in the bandwidth request contention period, are preferably proceeded by a 1 PS preamble and padded to a full TDU. CPEs may pack additional bandwidth requests for other connections into the same MAC packet as part of the padding to a full TDU. The uplink mapping is now described.

Figure 10:
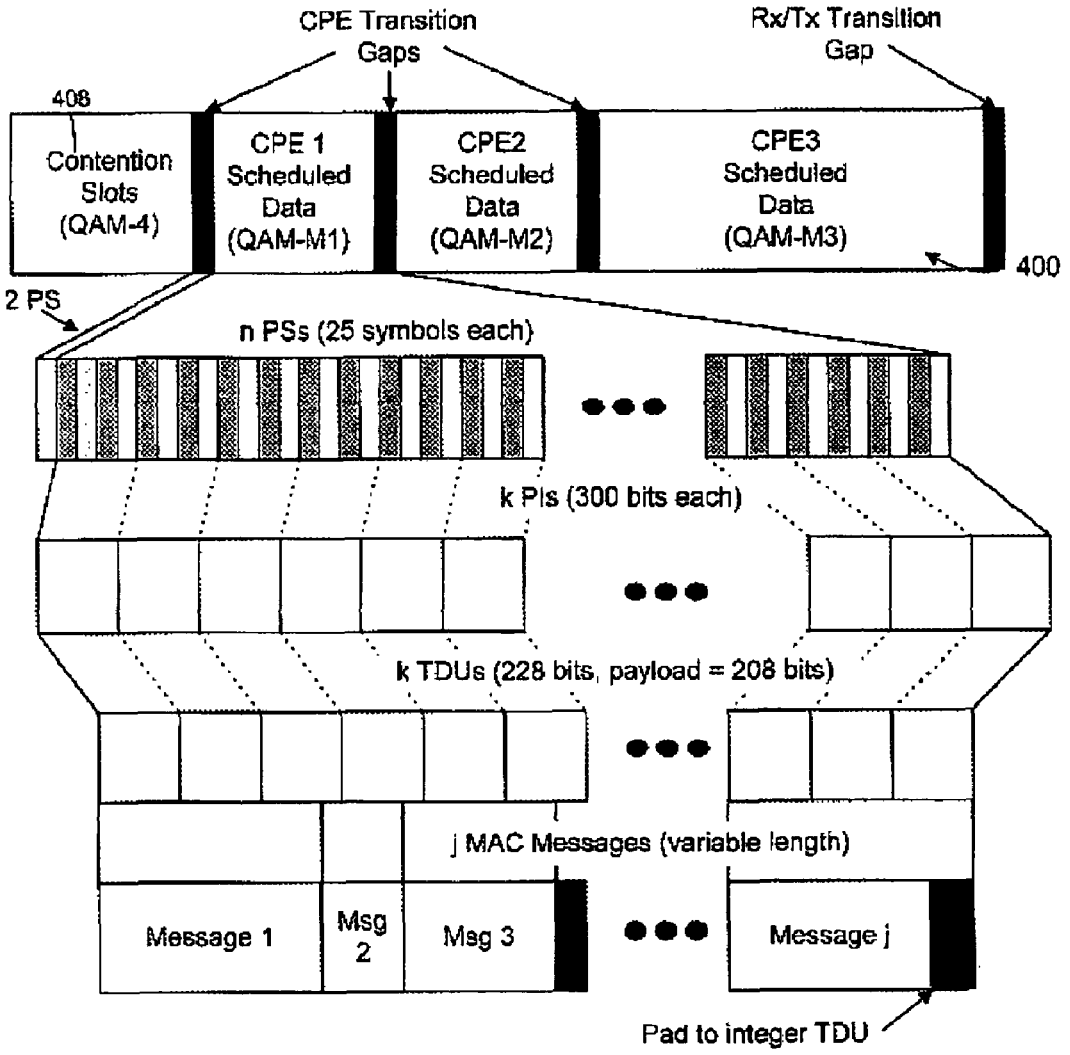
FIG. 10 shows an exemplary uplink mapping of MAC messages to PHY elements in accordance with the present invention.

FIG. 10 shows the mapping of the scheduled portion of the uplink sub-frame 400 adapted for use with the present invention to the uplink needs of users in one preferred embodiment of the present invention. Similar to the MTG 306 of FIG. 9, the CPE Transition Gap (CTG) 408 preferably contains a 1 PS preamble that ensures synchronization with the new CPE. Within the sub-frame 400, the TC/PHY packets 700 are preferably grouped by CPE. All messages, other than bandwidth requests transmitted in bandwidth request contention slots, from an individual CPE are preferably transmitted using the same modulation scheme. In the preferred embodiment, each CPE's transmission is preferably padded to be an integer multiple of a TDU to provide an integer multiple of a PI after coding. The padding preferably uses the fill byte 0×55. The uplink and downlink mapping provides a mechanism for the higher communication protocol layers (CG and DAMA) to transport data to the PHY layer 508.

By using the data transportation and synchronization technique of the present invention, scheduled uplink and downlink data is transported and synchronized between the MAC layers 502, 504 (FIG. 5) and the physical layer 508 (FIG. 5). The scheduled uplink and downlink data are preferably transported within the uplink sub-frame 400 and the downlink sub-frame 300, respectively, based upon the modulation scheme used by the CPEs 10. The present invention preferably uses the MAC packet formats 600a, 600b, 600c, 600d (FIGS. 6a-6d, respectively) and the TC/PHY packet format 700 (FIG. 7) to transport uplink and downlink data between the MAC layers 502, 504 and the physical layer 508. Mapping of MAC entities to PHY elements is preferably performed according to the 4-stage uplink and downlink mapping described above (FIGS. 8-10). In accordance with the present invention and in the manner described in more detail below, MAC packet data is mapped to the TC/PHY packet format 700 in a variable length manner. Accordingly, a MAC packet that is larger than a TC/PHY packet 700 is fragmented. A MAC packet that is smaller than a TC/PHY packet 700 is concatenated with the next MAC packet in one TC/PHY packet 700 unless one of two conditions apply. These conditions are described below in more detail.

The present inventive method and apparatus efficiently transports data between the MAC and the physical communications protocol layers in a wireless communication system. In accordance with the present invention, bandwidth is efficiently used because multiple variable length messages are concatenated across multiple TC/PHY packets 700. The present invention advantageously synchronizes rapidly to the next data message when a data message header is lost across the data or air link. After a lost data or air link is reestablished, the present invention allows rapid synchronization because the wireless communication system only needs to scan the header present field 704 (FIG. 7) of the received TC/PHY packets 700 to find the next MAC header 640, 650, 660, or 670 (FIGS. 6a-6d). Thus, only a small amount of information (less than one MAC message) is lost when the data or air link is reestablished. As described below with reference to FIGS. 13-14, the present inventive data transportation and synchronization method and apparatus also allows for rapid synchronization when transporting ATM cells. Rapid synchronization is established by discarding ATM cells that have uncorrectable errors. This synchronization technique protects against the potential misinsertion of ATM cells because it protects against errors occurring in the ATM headers. The inventive ATM data transportation and synchronization technique is described in more detail below with reference to FIG. 13.

The present invention transports data using an inventive data transportation and synchronization technique. This technique is now described in detail with reference to FIG. 11.

Data Transportation and Synchronization Technique

In the preferred embodiment of the present invention, the payload preferably transmits variable length MAC packets 600a, 600b, 600c, and 600d as described above with reference to FIGS. 6a-6d. Depending on the length of a MAC packet 600a, 600b, 600c, or 600d, the present invention either fragments or concatenates the MAC packet 600a, 600b, 600c, 600d when mapping to the physical layer 508 (FIG. 5). In the preferred embodiment of the present invention, a TC/PHY packet 700 has a payload 712 (FIG. 7) with a maximum capacity, of 208 bits. The preferred maximum of 208 bits is exemplary only and one of ordinary skill in the art will recognize that other TC/PHY packet formats can be used and can have different maximum payloads. Sometimes a TC/PHY packet 700 will have less than the maximum capacity available for mapping a MAC packet 600a, 600b, 600c, or 600d. This situation occurs when a previous MAC packet 600 or fragment of a MAC packet has already been mapped into the present TC/PHY packet 700. For example, in the preferred embodiment, if a 96-bit MAC packet is mapped into a TC/PHY packet 700, then 112 bits are available in the payload 712 of the TC/PHY packet 700 for mapping the next MAC packet 600 using a concatenation technique. The procedure for transporting and mapping variable length MAC packets into TC/PHY packets 700 in this manner is shown in FIG. 11 and described in more detail below.

Figure 11:
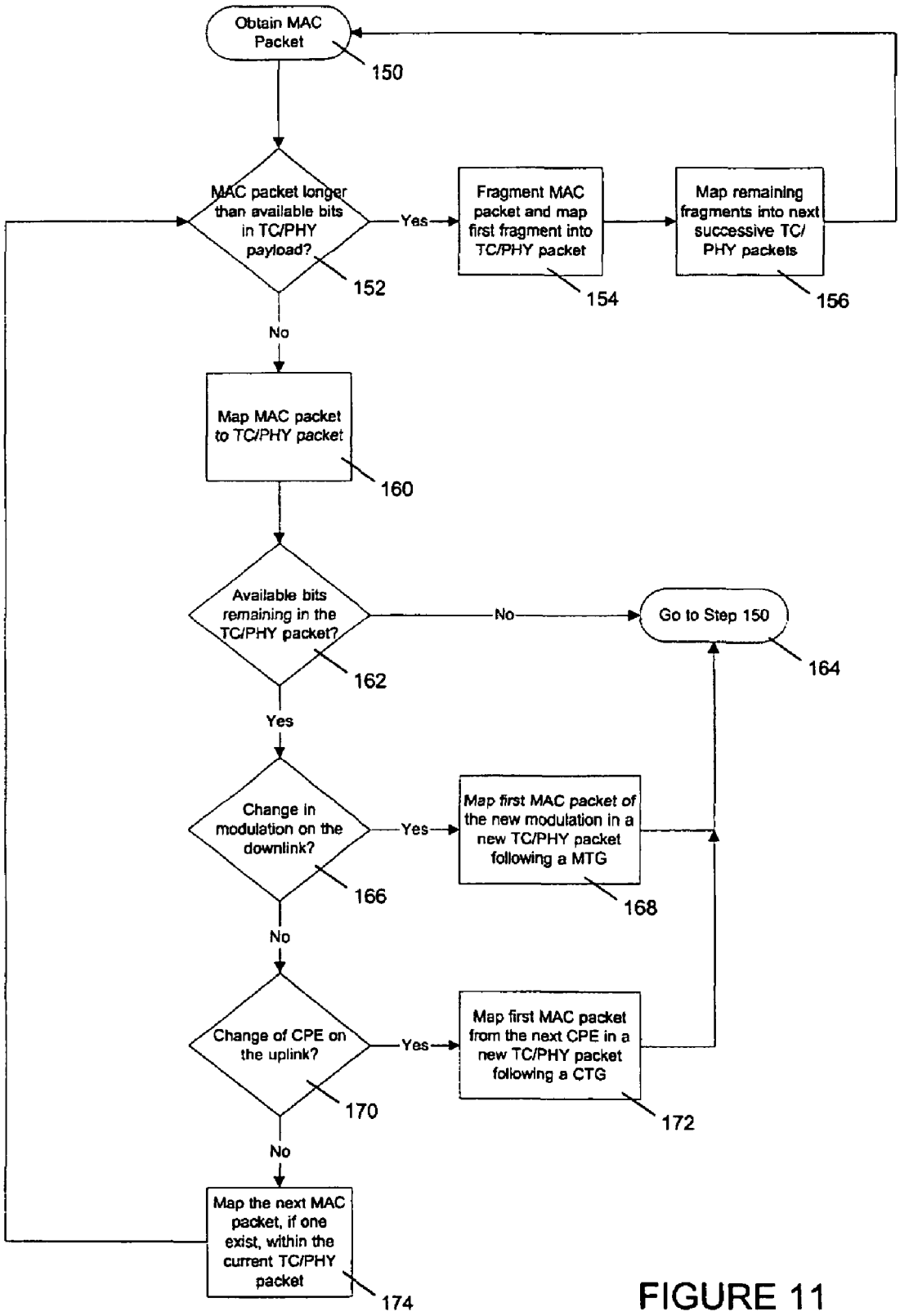
FIG. 11 is a flow diagram showing the preferred data transportation and synchronization method of the present invention.

As shown in FIG. 11, the present inventive method initiates the data transportation and synchronization technique at STEP 150 by first obtaining a MAC packet 600. The method proceeds to a decision step at STEP 152 to determine whether the MAC packet 600 is longer than the available bits in the payload 712 of the present TC/PHY packet 700. If so, the method proceeds to a STEP 154 where the method fragments the MAC packet 600, if not, the method proceeds to a STEP 160 where the method maps the MAC packet 600 to the TC/PHY packet.

At STEP 154 the method fragments the MAC packet 600 into smaller bit-length packets called "fragment MAC packets". A MAC packet 600 that has been fragmented comprises at least a first fragment MAC packet and a second fragment MAC packet. The first fragment MAC packet is preferably constructed to fill up the remaining available bits in the present TC/PHY packet 700. The present method maps the first fragment MAC packet into the present TC/PHY packet 700 at STEP 154 as described above. The method then proceeds to STEP 156. At STEP 156, the method maps the remaining fragments into the next successive TC/PHY packets until all fragments are mapped. In accordance with the preferred embodiment of the present invention, the method preferably transmits all fragments from a MAC packet on the same TDD frame 200. The method then returns to STEP 150 to obtain another MAC packet.

At STEP 160, the method maps the MAC packet into the TC/PHY packet as described above. The method then proceeds to a decision STEP 162 to determine whether there are any available bits remaining in the payload of the TC/PHY packet 700. Bits remain available if the mapped MAC packet ended in the middle of the TC/PHY packet 700 (i.e., before filling the entire payload 712). If bits in the payload remain available, the method proceeds to a decision STEP 166. If not, the method proceeds to a STEP 164 where the method returns to STEP 150 to obtain another MAC packet as described above. At the decision STEP 166, the method determines whether there was a change in modulation on the downlink. If so, the method proceeds to a STEP 168 to obtain a new TC/PHY packet 700 following an MTG 306, 306', if not, the method proceeds to a decision STEP 170. Thus, following STEP 168 the first MAC packet of the new modulation will be mapped into the new TC/PHY packet 700 following an MTG 306, 306'. After STEP 168 the method proceeds to STEP 164 where the method returns to STEP 150 to obtain another MAC packet as described above. The next MAC packet will be transmitted using a new modulation scheme.

At the decision STEP 170, the inventive method determines whether there was a change of CPE on the uplink. If so, the method proceeds to a STEP 172 to obtain a new TC/PHY packet 700 following a CTG 408, 408', 408", if not, the method proceeds to a STEP 174. Thus, at STEP 172 the first MAC packet of the next CPE is mapped into the new TC/PHY packet 700 following a CTG 408, 408', and 408". After STEP 172 the method proceeds to STEP 16 where the method returns to STEP 150 to obtain another MAC packet that will be in the new CPE. At STEP 174, the method maps the next MAC packet, if one exists, within the present TC/PHY packet 700. The method then returns to decision STEP 152 and functions as described above.

ATM Convergence Sub-process and Segmentation and Reassembly (SAR) Process

As described above with reference to FIG. 5, the present invention preferably uses a layered architecture to transport data in a wireless communication system. Architecturally, the MAC can be viewed as having at least an "agnostic" layer and a "convergence" layer. The agnostic layer can transport both fixed and variable length packets without having knowledge of the data type that the packets represent. The convergence layer adapts packet formats of a specific protocol to the agnostic MAC format. Referring again to FIG. 5, for example, the LL-MAA 504 provides the agnostic layer of the wireless MAC, while the ATM convergence subprocess adapts an ATM packet format to the agnostic MAC format. As is well known in the communications art, ATM defines adaptation layers for converting from data packet formats to ATM "cell" formats. For example, two such well known ATM adaptation layers are the AAL-1 and AAL-5 adaptation layers. The data packets are segmented into fixed-length ATM cells at the transmit side of communications, and are reassembled back into data packets at the receive side. This process is known as Segmentation and Reassembly (SAR). The AAL-5 ATM adaptation layer defines one such process, which is shown diagrammatically in FIG. 12.

Figure 12:
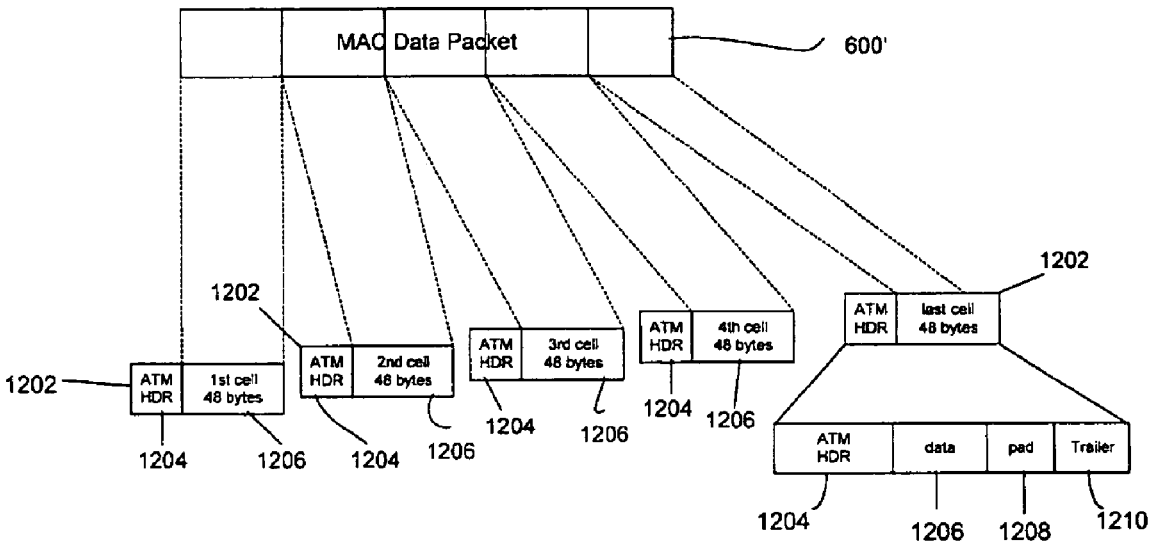
FIG. 12 shows one exemplary conversion of MAC data packets into ATM cells for ATM data transportation and synchronization in accordance with the present invention.

FIG. 12 shows one exemplary conversion of MAC data packets 600' into ATM cells 1202 for ATM data transportation and synchronization in accordance with the present invention. In the example shown, the conversion of MAC data packets 600' to ATM cells 1202 is performed by the AAL-5 ATM adaptation layer and the SAR processes. As shown in FIG. 12, each ATM cell 1202 comprises an ATM header 1204 and a fixed-length payload 1206. The fixed-length payload 1206 of each ATM cell comprises 48 bytes of data. The ATM header 1204 is typically 5 bytes long. However, in some wireless systems, the last byte of the ATM header 1204 is removed. Thus, the header may optionally be 4 or 5 bytes in length. In either case, the header 1204 is always the same length for every ATM cell 1202 that is transported within the system.

The AAL-5 SAR process introduces overhead known as an "ATM cell tax". The ATM cell tax amounts to approximately 10% overhead. The AAL-5 process adds an additional overhead resulting from the necessity to align packet boundaries to ATM cell boundaries. The alignment is performed using the padding field 1208 and trailer field 1210 in the last ATM cell 1202. This overhead is called the ATM trailer overhead. The ATM trailer overhead on the average is approximately 26 bytes per packet. The AAL-5 and the SAR processes are described in more detail in the publicly available ITU-T 363.5 recommendation, and therefore are not described in more detail herein.

Data Transportation and Synchronization Technique when Transporting ATM Cells

As described above with reference to FIG. 11, the present invention efficiently transmits data in a wireless communication system by synchronizing variable length MAC packets to TC/PHY packets. This section describes an inventive method for synchronizing to fixed-length ATM cell boundaries and for protecting against the possible misinsertion of ATM cells. As described above, the present invention advantageously rapidly synchronizes to subsequent data messages when a data message header is lost or corrupted during transmission. Rapid synchronization is established by scanning the header present fields of the incoming TC/PHY packets. When transporting ATM cells using the present data transportation and synchronization invention, rapid synchronization can be established by discarding ATM cells that have uncorrectable errors. This synchronization technique protects against the potential misinsertion of ATM cells because it protects against errors occurring in the ATM headers. The inventive ATM data transportation and synchronization technique is now described in more detail with reference to FIG. 13.

Figure 13:
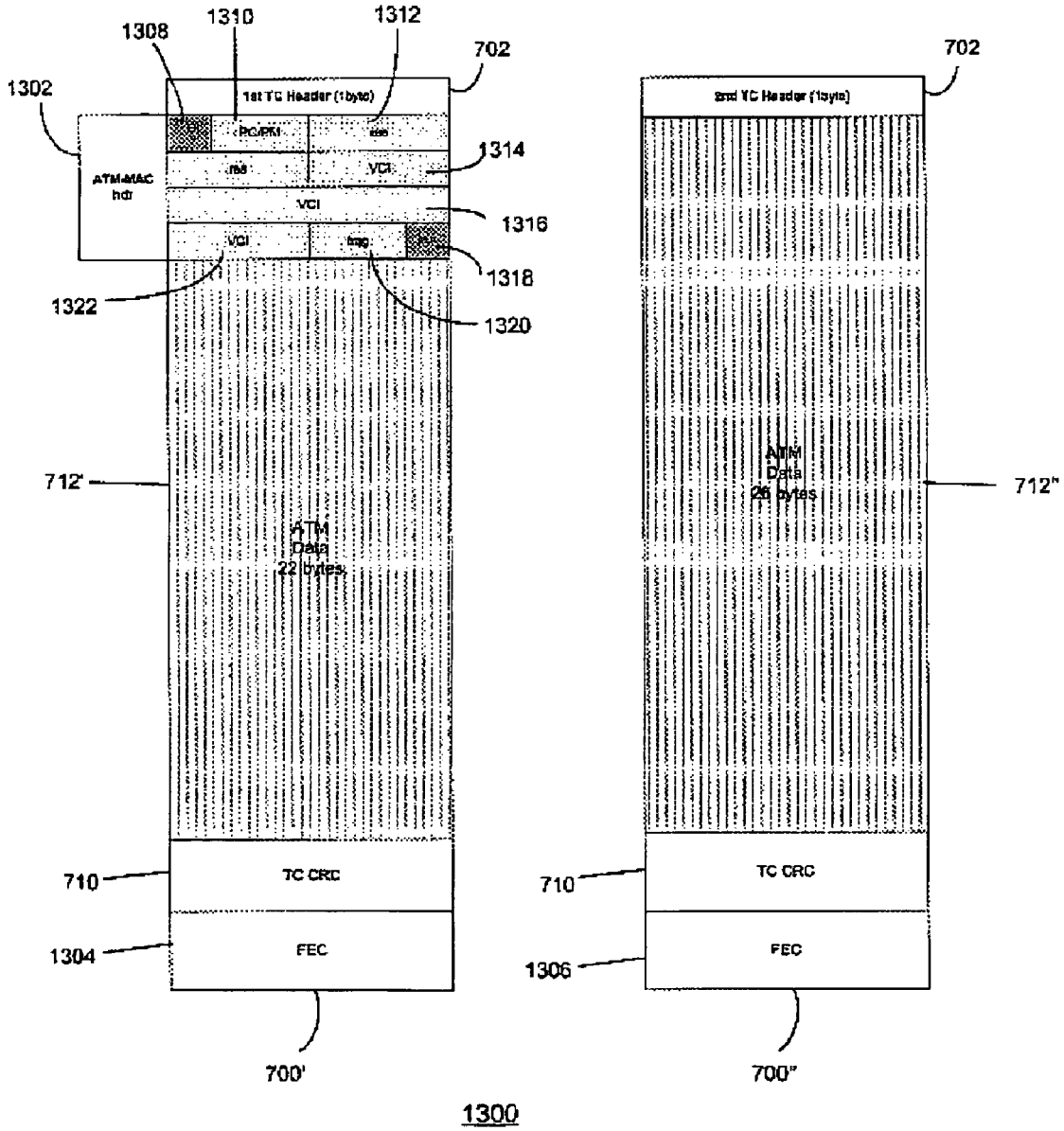
FIG. 13 shows an exemplary packet format that is used by the present invention for the transportation and synchronization of ATM cells.

FIG. 13 shows the packet format 1300 that is used by the present invention for the transportation and synchronization of ATM cells. As described above, ATM cells comprise fixed-length packets having data payloads of 48 bytes in length. As shown in FIG. 13, the ATM data 712' and 712" is transported in accordance with the present invention using two TC/PHY packets 700' and 700" (described in more detail above with reference to FIG. 7). More specifically, and as shown in FIG. 13, approximately one-half (22 bytes of ATM cell data) of an ATM cell 1202 (FIG. 12) is transported in a first TC/PHY packet 700', and the remaining portion (remaining 26 bytes of ATM cell data) 712" is transported in a second TC/PHY packet 700". As described above with reference to FIG. 7, the TC/PHY packet (or "TC Data Unit") 700 provides a mechanism for mapping MAC packets to PHY elements. The TDU 700 includes a TC header 702 field, a data payload field 712, and a TC CRC field 710. These fields are described in detail above with reference to FIG. 7.

In addition to these fields, the first TDU 700' of the inventive packet format 1300 shown in FIG. 13 also includes an ATM-MAC header 1302. Significantly, the ATM header information is contained in only the first TDU 700'. No ATM header information is carried by the second TDU 700". The MAC header 1302 includes a number of pre-defined fields. These fields include the EH field 1308, the PC/PM field 1310, a reserved field 1312, a VCI field 1314, 1316, 1322, a "frag" field 1320, and a PLP field 1320. The EH and the PC/PM fields 1308, 1310, respectively are provided by the wireless system. The PC/PM field 1310 is used for power control purposes. The VCI fields are standard ATM routing information tag. The "frag" field 1320 is an ATM PTI (payload type indicator) field. The PLP field 1320 is used to indicate packet loss priority. The functions and details of the ATM fields shown in FIG. 13 are well known in the communications art and therefore are not described in more detail herein.

As shown in FIG. 13, the ATM packet format 1300 may also include two forward error correction (FEC) fields 1304 and 1306. The FEC field can be used to detect and protect against errors in the ATM cell. The FEC fields 1304, 1306 are provided by the physical layer of the layered data transport architecture. ATM headers used in other wireless communication systems typically comprise 4 bytes of information, protected by one byte of CRC referred to as the HEC (Header Error Check) byte. Therefore, the ATM headers used by other wireless communication systems typically comprise 5 bytes. If the HEC detects an error in the ATM header, the previous wireless systems typically discard the entire ATM cell (i.e., the entire 48 bytes of ATM cell data are discarded by the system). However, as shown in FIG. 13, the present invention uses the TC CRC 710 and the FEC 1304 fields to detect and correct errors in the ATM header field 1302 and in the ATM data payload fields 712' and 712". This renders the HEC field redundant and therefore it is not transported in the present data transportation system.

In accordance with the present inventive ATM data transportation and synchronization method and apparatus, if an uncorrectable error is detected in the first TDU 700', the entire ATM cell is discarded by discarding both the first and second TDUs 700', 700". Both TDUs are discarded because the uncorrectable error can cause irreparable damage to the ATM header 1302, and therefore detrimentally affect the insertion (by higher layers of the MAC) of the ATM cell into the MAC variable length packet. More specifically, if an uncorrectable error occurs in the ATM-MAC header 1302, the entire ATM cell may be erroneously inserted into the wrong MAC packet. The discarding of the entire ATM cell upon detection of uncorrectable errors by the CRC and FEC fields in the first TDU 700' is similar to the action taken in the prior art wireless systems when the HEC byte detects errors in the ATM header. However, significantly, the present inventive method and apparatus only discards the entire ATM cell (i.e., both the TDU 700' and TDU 700") when an uncorrectable error is detected in the first TDU 700'. It does not take any discard action if an uncorrectable error is detected in the second TDU 700". Rather, if an uncorrectable error is detected in the second TDU 700", the error is noted, and both TDUs 700', 700" (i.e., the entire ATM cell) are passed to the higher communication layers for processing.

The present ATM data transportation and synchronization method and apparatus protects against errors occurring in the ATM headers because ATM headers are always transmitted in the first TDU 700'. No ATM header information is transmitted in the second TDU 700", and therefore the second TDU 700" can be passed to the higher communication layers without risking the misinsertion of ATM cells. The level of protection of the ATM header information provided by the present invention is better than the protection provided by the prior art use of the HEC field. The CRC and FEC fields protects against errors on the order of $10^{-12}$ in the presence of physical layer bit error rates of $10^{-3}$. Errors that occur in the second TDU 700" may be detected (and possibly corrected) by the higher communication layers such as the AAL-5 adaptation layer. The methods used by the higher communication layers to detect and correct these errors are well known and therefore are not described herein.

Figure 14:
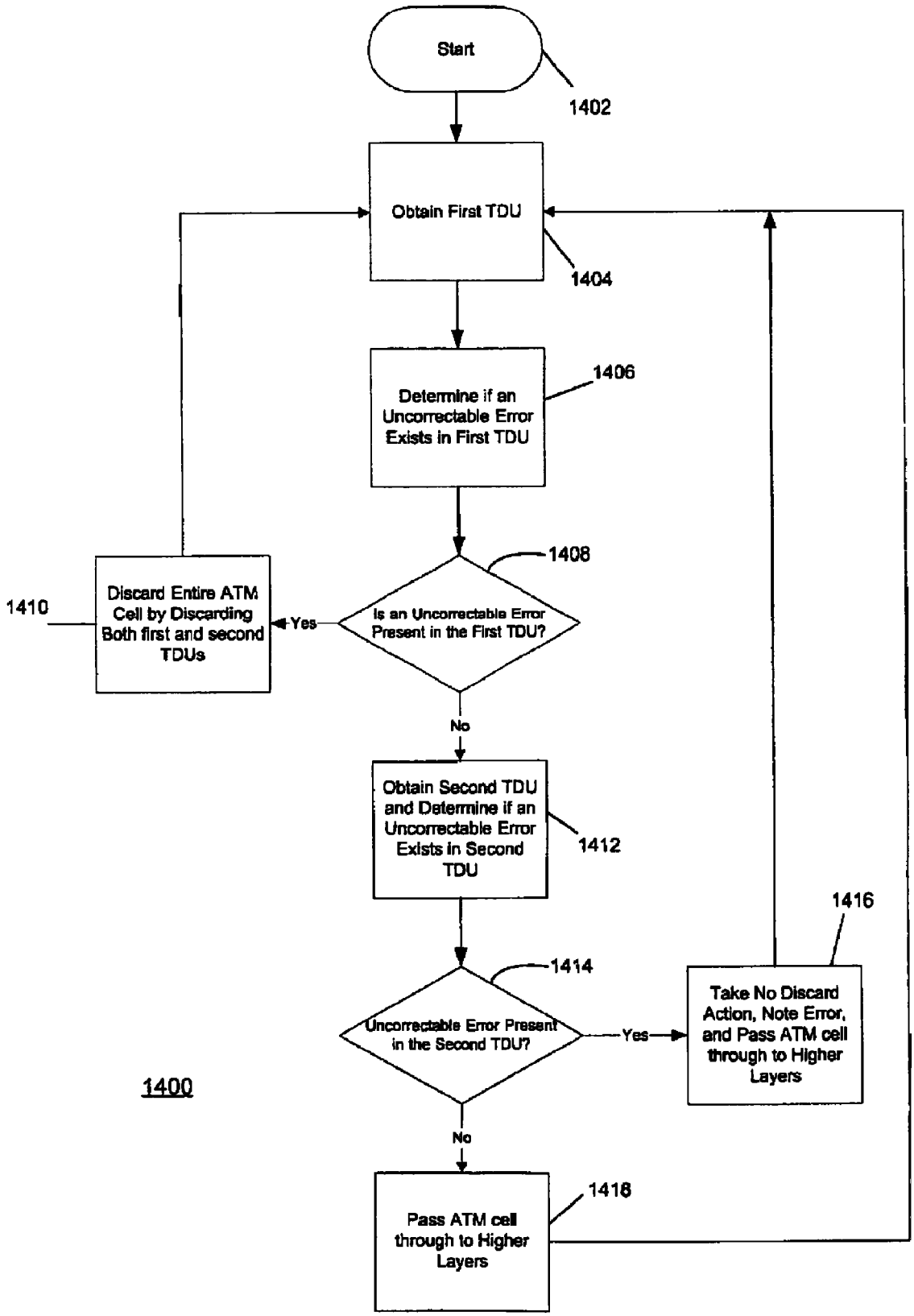
FIG. 14 shows a flowchart of the ATM data synchronization and error detection method of the present invention.

FIG. 14 shows a flowchart of the present inventive ATM data synchronization and error detection method. As shown in FIG. 14, the present inventive method 1400 starts at an initialization STEP 1402 and proceeds to a STEP 1404 whereat the first TC/PHY packet, or TDU, is obtained. For example, the TDU 700' of FIG. 13 is obtained during the STEP 1404. The method then proceeds to a STEP 1406 whereat a determination is made as to whether an uncorrectable error exists in the first TDU 700'. As described above with reference to FIG. 13, this determination may be made by using the TC CRC 710, or by using the FEC 1304, or the two may be used in combination. If either the CRC field 710, or the FEC field 1304, or both fields, indicate that there is an error, then an error condition exists. Those of ordinary skill in the communications art shall appreciate that other means for determining whether an uncorrectable error exists in the first TDU 700' can be used without departing from the spirit or scope of the present invention. Referring again to FIG. 14, the method proceeds to a decision STEP 1408. If an uncorrectable error is present in the first TDU 700', the method proceeds to a STEP 1410. Otherwise, the method proceeds to a STEP 1412.

At the STEP 1410, the inventive method discards the entire ATM cell when uncorrectable errors are found in the first TDU. The entire ATM cell is discarded by discarding both the first TDU 700'. and the second TDU 700". The method then returns to the STEP 1404 to obtain the next first TDU. As described above with reference to FIG. 13, this approach advantageously protects against errors in the ATM header because the ATM header is always carried in the first TDU 700'. As a consequence, the present invention also protects against the erroneous insertion of ATM cells.

If no uncorrectable error is found in the first TDU 700' at the STEP 1408, the method then proceeds to STEPs 1412 and 1414 to obtain the second TDU 700" and determine whether an uncorrectable error exists in the second TDU 700". As described above with reference to FIG. 13, the second TDU 700" contains a second half of an ATM cell (26 bytes of ATM data). Similar to the detection method used in the STEPS 1406 and 1408, errors are detected using the second TDU's TC CRC 710 and FEC 1306 fields described above with reference to FIG. 13. If an uncorrectable error is found to be present in the second TDU 700" at the STEP 1414, the method proceeds to a STEP 1416 whereat no discard action is taken. Rather, at the STEP 1414, the method simply notes the error that is present in the second TDU 700". The method then passes the ATM cell (i.e., it passes both the first and second TDUs, 700' and 700", respectively) through to the higher communication layers of the MAC. As described above, errors in the second TDU 700" may be detected by the higher MAC communication layers (such as, for example, the AAL-5 adaptation layer). Once the error is noted at the STEP 1416, the method returns to the STEP 1404 whereat a next first TDU is obtained. As shown in FIG. 14, if an uncorrectable error is not present in the second TDU 700", the method simply passes the ATM cell (both the first and second TDUs) through to the higher communication layers at a STEP 1418, before returning to the STEP 1404.

Summary

In summary, the data transportation and synchronization method and apparatus of the present invention includes a powerful, highly efficient means for transporting and synchronizing data in a wireless communication system. The present data transportation and synchronization method and apparatus uses a combination of data formats and a data transportation technique to efficiently transport data in a communication system. Advantageously, the present invention rapidly synchronizes layers when a loss of data occurs. This rapid synchronization prevents data loss of more than one MAC message upon the re-establishment of the data or air link. In addition, multiple MAC packets are preferably mapped to concatenate multiple TC/PHY packets 700 using the inventive technique.

An inventive method and apparatus for transporting and synchronizing to fixed-length ATM cell boundaries and for protecting against the potential misinsertion of ATM cells has been described. An inventive ATM packet format is described. The ATM packet format is used by the present invention for the transportation and synchronization of ATM cells. The ATM packets include TC CRC and FEC fields that are used to detect errors occurring within each ATM cell. In accordance with the present invention, ATM cells are transported in exactly two TC/PHY packets, or TDUs. The first TDU includes an ATM-MAC header. Significantly, the ATM header information is contained in the first TDU only. No ATM header information is carried by the second TDU. In accordance with the present invention, an entire ATM cell is discarded if an uncorrectable error is detected in the first TDU. If no uncorrectable error occurs in the first TDU, the second TDU is checked for errors. If an undetectable error exists in the second TDU, no discard action is taken. The error is noted, and both TDUs are passed through to the higher MAC communication layers. The inventive method protects against errors occurring in the ATM header because the ATM header is always carried in the first TDU. Consequently, misinsertion of ATM cells is also prevented.

A number of embodiments of the present invention have been described. Nevertheless, it will be understood that various modifications may be made without departing from the spirit and scope of the present invention. For example, although the present inventive method and apparatus has been described above as being used in a TDD wireless communication system, it is just as readily adapted for use in an FDD wireless communication system. Furthermore, the present inventive method and apparatus can be used in virtually any type of communication system. Its use is not limited to a wireless communication system. One such example is use of the invention in a satellite communication system. In such a communication system, satellites replace the base stations described above. In addition, the CPEs would no longer be situated at fixed distances from the satellites. Alternatively, the present invention can be used in a wired communication system. The only difference between the wired system and the wireless system described above is that the channel characteristics vary between the two. However, the data transportation and synchronization do not change as between the two types of systems. Accordingly, it is to be understood that the invention is not to be limited by the specific illustrated embodiment, but only by the scope of the appended claims.

What is claimed is:

1. A method of synchronizing and transporting data in a wireless communication system, wherein the wireless communication system includes a plurality of customer premise equipment (CPE) in communication with associated and corresponding base stations, and wherein the base stations maintain uplink and downlink sub-frame maps representative of bandwidth allocations in uplink and downlink communication links, and wherein the base stations each include an associated and corresponding media access control (MAC) having a plurality of MAC data messages, and wherein the MAC transports a MAC data message through a MAC data packet that is mapped to at least one Transmission Convergence Data Unit (TDU) in a layered data transport architecture, and wherein the data includes ATM cell data configured into at least one ATM cell, the method comprising the steps of:

(a) obtaining a first Transmission Convergence Data Unit (TDU), wherein the first TDU includes an ATM header for a selected ATM cell, and wherein the first TDU includes ATM data bytes of the selected ATM cell;

(b) determining whether an uncorrectable data error is present in the first TDU obtained in step (a);

(c) obtaining a second TDU, wherein the second TDU includes remaining data bytes of the selected ATM cell;

(d) determining whether an uncorrectable data error is present in the second TDU obtained in step (c);

(e) discarding the entire selected ATM cell by discarding both the first and second TDUs if an uncorrectable data error is found in the first TDU, and then returning to step (a) to obtain a next selected ATM cell, else proceeding to step (f);

(f) noting that an error condition exists if an uncorrectable data error is found in the second TDU obtained in step (c); and (g) passing the entire selected ATM cell to high level communication layers of the MAC and returning to step (a) to obtain a next selected ATM cell.

2. The method of synchronizing and transporting data of claim 1, wherein the MAC data packets are segmented into fixed-length ATM cells for transportation in the wireless communication system.

3. The method of synchronizing and transporting data of claim 2, wherein the MAC data packets are segmented into fixed length ATM cells upon transmission and reassembled into MAC data packets upon reception in accordance with a pre-defined Segmentation and Reassembly (SAR) process.

4. The method of synchronizing and transporting data of claim 3, wherein the MAC data packets are segmented in accordance with an ATM adaptation layer, and wherein the ATM adaptation layer is an AAL-5 ATM adaptation layer.

5. The method of synchronizing and transporting data of claim 1, wherein the MAC data packets comprise a MAC header and a MAC payload having a length of n bits.

6. The method of synchronizing and transporting data of claim 1, wherein the length of n bits is variable.

7. The method of synchronizing and transporting data of claim 1, wherein the length of n bits is fixed.

8. The method of synchronizing and transporting data of claim 5, wherein the MAC header further comprises a fragmentation control field, and wherein the fragmentation control field contains information regarding fragmentation of the MAC data message.

9. The method of synchronizing and transporting data of claim 5, wherein the first and the second TDUs comprise:

(a) a TC/PHY payload; and (b) a TC/PHY header, further comprising a header present field, and wherein the header present field is set to a logical one when a MAC header is present within the TC/PHY payload.

10. The method of synchronizing and transporting data of claim 2, wherein the ATM cells each include an associated ATM header and an associated fixed-length ATM cell data payload.

11. The method of synchronizing and transporting data of claim 10, wherein the ATM cell data payload comprises 48 bytes of ATM cell data.

12. The method of synchronizing and transporting data of claim 2, wherein the first and second TDUs each further include an associated and respective TC CRC field and an associated and respective Forward Error Correction (FEC) field.

13. The method of synchronizing and transporting data of claim 12, wherein the CRC and FEC fields are used during the steps (b) and (d) to detect uncorrectable data errors in the selected ATM cell.

14. An apparatus for synchronizing and transporting data in a wireless communication system, wherein the wireless communication system includes a plurality of customer premise equipment (CPE) in communication with associated and corresponding base stations, and wherein the base stations maintain uplink and downlink sub-frame maps representative of bandwidth allocations in uplink and downlink communication links, and wherein the base stations each include an associated and corresponding media access control (MAC) having a plurality of MAC data messages, and wherein the MAC transports a MAC data message through a MAC data packet that is mapped to at least one Transmission Convergence Data Unit (TDU) in a layered data transport architecture, and wherein the data includes ATM cell data configured into at least one ATM cell, comprising:

(a) means for obtaining first and second Transmission Convergence Data Units (TDUs), wherein the first TDU includes an ATM header for a selected ATM cell, and wherein the TDUs include ATM data bytes of the selected ATM cell;

(b) means for determining whether uncorrectable data errors are present in the first or second TDUs;

(c) means, responsive to the determining means, for discarding the entire selected ATM cell if an uncorrectable error is found in the first TDU; and (d) means, responsive to the determining means, for noting that an error condition exists if an uncorrectable data error is found only in the second TDU, and for passing the entire selected ATM cell to higher level communication layers of the MAC.

15. The apparatus for synchronizing and transporting data of claim 14, wherein the MAC data packets are segmented into fixed-length ATM cells for transportation in the wireless communication system.

16. The apparatus for synchronizing and transporting data of claim 15, wherein the MAC data packets are segmented into fixed length ATM cells upon transmission and reassembled into MAC data packets upon reception in accordance with a pre-defined Segmentation and Reassembly (SAR) process.

17. The apparatus for synchronizing and transporting data of claim 16, wherein the MAC data packets are segmented in accordance with an ATM adaptation layer, and wherein the ATM adaptation layer is an AAL-5 ATM adaptation layer.

18. The apparatus for synchronizing and transporting data of claim 14, wherein the MAC data packets comprise a MAC header and a MAC payload having a length of n bits.

19. The apparatus for synchronizing and transporting data of claim 14, wherein the means for obtaining the first and second TDUs comprises means for mapping the MAC data packets into Transmission Convergence Data Units.

20. The apparatus for synchronizing and transporting data of claim 19, wherein the mapping means comprises a computer program executable on a computing device.

21. The apparatus for synchronizing and transporting data of claim 14, wherein the first and second TDUs each further include associated and respective TC CRC and Forward Error Correction (FEC) fields, and wherein the means for determining whether uncorrectable data errors are present in the first or second TDUs comprises a computer program, executable on a computing device, and adapted to process the TC CRC and FEC fields.

22. [A] *An article of manufacture comprising a non-transitory computer-readable medium having stored thereon a* computer program executable on a computing device, wherein the program is capable of synchronizing and transporting data in a wireless communication system, and wherein the wireless communication system includes a plurality of customer premise equipment (CPE) in communication with associated and corresponding base stations, and wherein the base stations maintain uplink and downlink sub-frame maps representative of bandwidth allocations in uplink and downlink communication links, and wherein the base stations each include an associated and corresponding media access control (MAC) having a plurality of MAC data messages, and wherein the MAC transports a MAC data message through a MAC data packet that is mapped to at least one Transmission Convergence Data Unit (TDU) in a layered data transport architecture, and wherein the data includes ATM cell data configured into at least one ATM cell, [comprising] *the non-transitory computer-readable medium having stored thereon the computer program that comprises*:

(a) a first set of instructions for obtaining a MAC data packet;

(b) a second set of instructions for mapping the MAC data packet into a plurality of Transmission Convergence Data Units (TDUs), wherein the TDUs each include ATM cell data;

(c) a third set of instructions for selecting an ATM cell comprising a first and a second TDU, and for obtaining the first TDU, wherein the first TDU includes an ATM header for the selected ATM cell, and wherein the first TDU also includes ATM data bytes of the selected ATM cell;

(d) a fourth set of instructions for obtaining the second TDU, wherein the second TDU includes remaining data bytes of the selected ATM cell;

(e) a fifth set of instructions for determining whether an uncorrectable data error is present in the first TDU, and for discarding the selected ATM cell if an uncorrectable data error is present in the first TDU;

(f) a sixth set of instructions for determining whether an uncorrectable data error is present in the second TDU, and for noting that an error condition exists if an uncorrectable data error is present in the second TDU; and (g) a seventh set of instructions for passing the selected ATM cell to higher level communication levels of the MAC.

23. The [computer program] *article of manufacture* of claim 22, wherein the first and second TDUs each further include an associated and respective TC CRC field and an associated and respective Forward Error Correction (FEC) field.

24. The [computer program] *article of manufacture* of claim 23, wherein the CRC and FEC fields are used in determining whether uncorrectable data errors are present in the selected ATM cell.

25. A method of re-synchronizing the transportation of ATM data in a wireless communication system, wherein the wireless communication system includes a plurality of customer premise equipment (CPE) in communication with associated and corresponding base stations having uplink and downlink communication links with the plurality of CPEs, and wherein the base stations maintain uplink and downlink sub-frame maps representative of bandwidth allocations in the uplink and downlink communication links, and wherein the base stations each include an associated and corresponding media access control (MAC) having a plurality of MAC data messages, and wherein the MAC transports a MAC data message through a MAC data packet that is mapped to at least one Transmission Convergence Data Unit (TDU) in a layered data transport architecture wherein each TDU includes ATM data bytes for transportation in the wireless communication system, and wherein each TDU further includes a header present field, and wherein at least one of the communication links may be intermittently disrupted during data transmission, the method comprising the steps of:

(a) detecting a disruption of a communication link during transmission of ATM data;

(b) reestablishing the communication link that was detected as disrupted at step (a);

(c) receiving a TDU;

(d) detecting the header present field of the TDU received at step (c), and if the header present field indicates that a header is present, proceeding to step (e), else returning to step (c); and (e) resuming data transmission on the disrupted communication link, wherein at most only one MAC data message is lost after reestablishing the communication link in step (b).

26. A method of re-synchronizing the transportation of ATM data in a wireless communication system, wherein the wireless communication system includes a plurality of customer premise equipment (CPE) in communication with associated and corresponding base stations having uplink and downlink communication links with the plurality of CPEs, and wherein the base stations maintain uplink and downlink sub-frame maps representative of bandwidth allocations in the uplink and downlink communication links, and wherein the base stations each include an associated and corresponding media access control (MAC) having a plurality of MAC data messages, and wherein the MAC transports a MAC data message through a MAC data packet that is mapped to at least one Transmission Convergence Data Unit (TDU) in a layered data transport architecture wherein each TDU includes ATM data bytes for transportation in the wireless communication system, and wherein at least one of the communication links may be intermittently disrupted during data transmission, the method comprising the steps of:

(a) detecting a disruption of a communication link during transmission of ATM data;

(b) reestablishing the communication link that was detected as disrupted at step (a);

(c) receiving a first TDU of a selected ATM cell;

(d) determining whether an uncorrectable error is present in the first TDU, and discarding the selected ATM cell if an uncorrectable error is present in the first TDU; and (e) resuming data transmission on the disrupted communication link, wherein at most only one MAC data message is lost after reestablishing the communication link in step (b).

*27. A system, comprising:*

*a plurality of subscriber stations; and*

*equipment to communicate with said subscriber stations over uplink and downlink portions of a communication channel to transmit information between said subscriber stations and an asynchronous transfer mode (ATM) network, said equipment being adapted to transport one or more media access control (MAC) data messages through a MAC data packet that is mapped to at least one transmission convergence data unit (TDU) in a layered data transport architecture, wherein said at least one TDU includes ATM data bytes for transmission in said communication channel, said equipment being further adapted to:*

*detect a disruption of a communication link during transmission of ATM data;*

*reestablish said disrupted communication link;*

*receive a TDU of an ATM cell;*

*discard the ATM cell in response to a presence of an uncorrectable error in the TDU; and*

*resume data transmission on the reestablished communication link.*

*28. The system of claim 27, wherein said equipment is further adapted to maintain uplink and downlink sub-frame maps representative of bandwidth allocation in said uplink and downlink portions.*

*29. The system of claim 27, wherein said equipment is further adapted to combine ATM cells in a MAC packet for transmission over said communication channel.*

*30. The system of claim 27, wherein said equipment is further adapted to segment portions of a MAC packet into ATM cells for transmission in said ATM network.*

*31. The system of claim 27, wherein said at least one TDU further includes a cyclic redundancy code field and a forward error correction field.*

*32. A system, comprising:*

*a plurality of subscriber stations; and*

*equipment to communicate with a plurality of subscriber stations over uplink and downlink portions of a communication channel to transmit information between said subscriber stations and an asynchronous transfer mode*

*(ATM) network, said equipment being adapted to transport one or more media access control (MAC) data messages through a MAC data packet that is mapped to at least one transmission convergence data unit (TDU) in a layered data transport architecture, wherein said at least one TDU includes ATM data bytes for transmission in said communication channel, said equipment being further adapted to:*

*discard first and second TDUs of an ATM cell and obtain a next ATM cell, in response to detection of an uncorrectable data error in the first TDU; and*

*note that an error condition exists and pass the ATM cell to a higher level MAC communication layer, in response to detection of an uncorrectable data error in the second TDU and in an absence of detection of an uncorrectable data error in the first TDU.*

*33. The system of claim 32, wherein said equipment is further adapted to maintain uplink and downlink sub-frame maps representative of bandwidth allocation in said uplink and downlink portions.*

*34. The system of claim 32, wherein said equipment is further adapted to combine ATM cells in a MAC packet for transmission over said communication channel.*

*35. The system of claim 32, wherein said equipment is further adapted to segment portions of a MAC packet into ATM cells for transmission in said ATM network.*

*36. The system of claim 32, wherein said at least one TDU further includes a cyclic redundancy code field and a forward error correction field.*

*37. An apparatus, comprising:*

*equipment to communicate with a plurality of subscriber stations over uplink and downlink portions of a communication channel to transmit information between said subscriber stations and an asynchronous transfer mode (ATM) network, said equipment being adapted to transport one or more media access control (MAC) data messages through a MAC data packet that is mapped to at least one transmission convergence data unit (TDU) in a layered data transport architecture, wherein said at least one TDU includes ATM data bytes for transmission in said communication channel, said equipment being further adapted to:*

*discard first and second TDUs of an ATM cell and obtain a next ATM cell, in response to detection of an uncorrectable data error in the first TDU; and*

*note that an error condition exists and pass the ATM cell to higher level MAC communication layer, in response to detection of an uncorrectable data error in the second TDU and in an absence of detection of an uncorrectable data error in the first TDU.*

*38. The apparatus of claim 37, wherein said equipment is further adapted to maintain uplink and downlink sub-frame maps representative of bandwidth allocation in said uplink and downlink portions.*

*39. The apparatus of claim 37, wherein said equipment is further adapted to combine ATM cells in a MAC packet for transmission over said communication channel.*

*40. The apparatus of claim 37, wherein said equipment is further adapted to segment portions of a MAC packet into ATM cells for transmission in said ATM network.*

*41. The apparatus of claim 37, wherein said at least one TDU further includes a cyclic redundancy code field and a forward error correction field.*

*42. An apparatus, comprising:*

*equipment to communicate with a plurality of subscriber stations over uplink and downlink portions of a communication channel to transmit information between said subscriber stations and an asynchronous transfer mode (ATM) network, said equipment being adapted to transport one or more media access control (MAC) data messages through a MAC data packet that is mapped to at least one transmission convergence data unit (TDU) in a layered data transport architecture, wherein said at least one TDU includes ATM data bytes for transmission in said communication channel, said equipment being further adapted to:*

*detect a disruption of a communication link during transmission of ATM data;*

*reestablish said disrupted communication link;*

*receive a TDU of an ATM cell;*

*discard the ATM cell in response to a presence of an uncorrectable error in the TDU; and*

*resume data transmission on the reestablished communication link.*

*43. The apparatus of claim 42, wherein said equipment is further adapted to maintain uplink and downlink sub-frame maps representative of bandwidth allocation in said uplink and downlink portions.*

*44. The system of claim 42, wherein said equipment is further adapted to combine ATM cells in a MAC packet for transmission over said communication channel.*

*45. The system of claim 42, wherein said equipment is further adapted to segment portions of a MAC packet into ATM cells for transmission in said ATM network.*

*46. The system of claim 42, wherein said at least one TDU further includes a cyclic redundancy code field and a forward error correction field.*

*47. The system of claim 27, wherein at most only one MAC data message is lost after reestablishing the communication link.*

*48. The system of claim 27, further comprising a communication hub connected to said equipment, said communication hub including an ATM switch to provide at least one ATM service to one or more of said subscriber stations, said at least one ATM service being selected from a group of services consisting of a video service, a voice service, and a data service.*

*49. The system of claim 32, further comprising a communication hub connected to said equipment, said communication hub including an ATM switch to provide at least one ATM service to one or more of said subscriber stations, said at least one ATM service being selected from a group of services consisting of a video service, a voice service, and a data service.*

*50. The apparatus of claim 42, wherein at most only one MAC data message is lost after reestablishing the communication link.*

*51. A method, comprising:*

*communicating with a plurality of subscriber stations over uplink and downlink portions of a communication channel to transmit information between said subscriber stations and an asynchronous transfer mode (ATM) network, said communicating including transporting one or more media access control (MAC) data messages through a MAC data packet that is mapped to at least one transmission convergence data unit (TDU) in a layered data transport architecture, wherein said at least one TDU includes ATM data bytes for transmission in said communication channel;*

*discarding first and second TDUs of an ATM cell and obtain a next ATM cell, in response to detection of an uncorrectable data error in the first TDU; and*

*noting that an error condition exists and passing the ATM cell to higher level MAC communication layer, in*

*response to detection of an uncorrectable data error in the second TDU and in an absence of detection of an uncorrectable data error in the first TDU.*

*52. The method of claim 51, further comprising maintaining uplink and downlink sub-frame maps representative of bandwidth allocation in said uplink and downlink portions.*

*53. The method of claim 51, further comprising combining ATM cells in a MAC packet for transmission over said communication channel.*

*54. The method of claim 51, further comprising segmenting portions of a MAC packet into ATM cells for transmission in said ATM network.*

*55. The method of claim 51, wherein said at least one TDU further includes a cyclic redundancy code field and a forward error correction field.*

*56. A method, comprising:*

*communicating with a plurality of subscriber stations over uplink and downlink portions of a communication channel to transmit information between said subscriber stations and an asynchronous transfer mode (ATM) network, said communicating including transporting one or more media access control (MAC) data messages through a MAC data packet that is mapped to at least one transmission convergence data unit (TDU) in a layered data transport architecture, wherein said at least one TDU includes ATM data bytes for transmission in said communication channel;*

*detecting a disruption of a communication link during transmission of ATM data;*

*reestablishing said disrupted communication link;*

*receiving a TDU of an ATM cell;*

*discarding the ATM cell in response to a presence of an uncorrectable error in the TDU; and*

*resuming data transmission on the reestablished communication link.*

*57. The method of claim 56, further comprising maintaining uplink and downlink sub-frame maps representative of bandwidth allocation in said uplink and downlink portions.*

*58. The method of claim 56, further comprising combining ATM cells in a MAC packet for transmission over said communication channel.*

*59. The method of claim 56, further comprising segmenting portions of a MAC packet into ATM cells for transmission in said ATM network.*

*60. The method of claim 56, wherein said at least one TDU further includes a cyclic redundancy code field and a forward error correction field.*

*61. An apparatus, comprising:*

*equipment to communicate with a plurality of subscriber stations over uplink and downlink portions of a communication channel to transmit information between said subscriber stations and an asynchronous transfer mode (ATM) network, said equipment being adapted to transport one or more media access control (MAC) data messages through a MAC data packet that is mapped to at least one transmission convergence data unit (TDU) in a layered data transport architecture, wherein said at least one TDU includes ATM data bytes for transmission in said communication channel, said equipment including:*

*means for discarding first and second TDUs of an ATM cell and for obtaining a next ATM cell, in response to detection of an uncorrectable data error in the first TDU; and*

*means for noting that an error condition exists and for passing the ATM cell to higher level MAC communication layer, in response to detection of an uncorrectable data error in the second TDU and in an absence of detection of an uncorrectable data error in the first TDU.*

*62. The apparatus of claim 61, wherein said equipment is further adapted to maintain uplink and downlink sub-frame maps representative of bandwidth allocation in said uplink and downlink portions.*

*63. The apparatus of claim 61, wherein said equipment is further adapted to combine ATM cells in a MAC packet for transmission over said communication channel.*

*64. The apparatus of claim 61, wherein said equipment is further adapted to segment portions of a MAC packet into ATM cells for transmission in said ATM network.*

*65. The apparatus of claim 61, wherein said at least one TDU further includes a cyclic redundancy code field and a forward error correction field.*

* * * * *

UNITED STATES PATENT AND TRADEMARK OFFICE

CERTIFICATE OF CORRECTION

PATENT NO. : RE42,788 E
APPLICATION NO. : 11/499822
DATED : October 4, 2011
INVENTOR(S) : Bourlas et al.

It is certified that error appears in the above-identified patent and that said Letters Patent is hereby corrected as shown below:

Column 1, line 15, delete "(CIP," and insert -- (CIP) --.

Column 1, lines 25-26, delete "assigned co-pending; application" and insert -- assigned application --.

Column 28, line 22, in Claim 44, delete "The system of" and insert -- The apparatus of --.

Column 28, line 25, in Claim 45, delete "The system of" and insert -- The apparatus of --.

Column 28, line 28, in Claim 46, delete "The system of" and insert -- The apparatus of --.

Signed and Sealed this
Nineteenth Day of June, 2012

David J. Kappos

David J. Kappos
*Director of the United States Patent and Trademark Office*